US010789328B1

(12) United States Patent
Jadhav et al.

(10) Patent No.: US 10,789,328 B1
(45) Date of Patent: Sep. 29, 2020

(54) ENHANCED SECURITY FOR SCRAPING DATA FROM INFORMATION SERVERS

(71) Applicants: Bhupesh Baliram Jadhav, Bangalore (IN); Swathi Manjunath, Bengaluru (IN); Suman Yadav, Bangalore (IN); Muniyaraj Samayavel, Bangalore (IN)

(72) Inventors: Bhupesh Baliram Jadhav, Bangalore (IN); Swathi Manjunath, Bengaluru (IN); Suman Yadav, Bangalore (IN); Muniyaraj Samayavel, Bangalore (IN)

(73) Assignee: Intuit Inc., Mountain View, CA (US)

( * ) Notice: Subject to any disclaimer, the term of this patent is extended or adjusted under 35 U.S.C. 154(b) by 315 days.

(21) Appl. No.: 15/977,991

(22) Filed: May 11, 2018

(51) Int. Cl.
*G06F 16/958* (2019.01)
*H04L 29/06* (2006.01)
*G06F 21/62* (2013.01)

(52) U.S. Cl.
CPC ........ *G06F 16/972* (2019.01); *G06F 21/6254* (2013.01); *H04L 63/08* (2013.01); *H04L 63/10* (2013.01)

(58) Field of Classification Search
CPC ... G06F 16/972; G06F 21/6254; H04L 63/08; H04L 63/10
See application file for complete search history.

(56) References Cited

U.S. PATENT DOCUMENTS 9,436,763 B1 * 9/2016 Gianos ................. G06F 16/951
10,097,533 B2 * 10/2018 Child ...................... G06F 21/41

OTHER PUBLICATIONS

Net2000 Ltd., "Data Masking: What You Need to Know What You Really Need to Know Before You Begin"; Net2000 Ltd., 2016 (25 pages).
Wikipedia, "Data masking"; Retrieved from <https://en.wikipedia.org/wiki/Data_masking>; Article last edited Dec. 19, 2017; Last Accessed Mar. 9, 2018 (6 pages).
Data Masker by Net2000 Ltd., "Data Masker: Fast and Effective Data Masking Software"; Retrieved from <http://www.datamasker.com/>; Last Accessed Mar. 9, 2018 (3 pages).

\* cited by examiner

*Primary Examiner* — Patrice L Winder
*Assistant Examiner* — Aye M Aung
(74) *Attorney, Agent, or Firm* — Ferguson Braswell Fraser Kubasta PC

(57) ABSTRACT

A method for substituting credentials that involves generating a response to a request associated with access to an information server, the response including a first page with one or more entry fields that each accept a developer credential of a set of developer credentials and with an entry field that accepts a first set of script commands; receiving a first developer credential of the set of developer credentials and the first set of script commands; wherein the first set of script commands include a first dummy credential of the set of dummy credentials; instantiating an executor instance that executes a browser; accessing, by the browser, a second page from the information server using a first credential of the set of user credentials; rendering, by the browser, the second page with a first dummy credential of the set of dummy credentials that is mapped to the first user credential of the set of user credentials; and transmitting a third page to the developer machine, the third page including a section that displays the second page rendered by the browser with the first dummy credential.

21 Claims, 18 Drawing Sheets

US 10,789,328 B1

ENHANCED SECURITY FOR SCRAPING DATA FROM INFORMATION SERVERS

BACKGROUND

Logging into servers that provide sensitive information, such as a bank website, requires enhanced security measures. Scraping information from these information servers requires complex scripts that are able to traverse the security measures with proper authority and permissions.

Testing and maintaining the scripts used to scrape the sensitive information from servers has the potential to expose the sensitive information from the server to the developer that is testing and maintaining the script. A challenge is to allow the script developer to access the server without exposing the sensitive information provided by the server to the script developer.

SUMMARY

In general, in one or more aspects, the invention relates to a method for substituting credentials that involves generating a response to a request associated with access to an information server, the response including a first page with one or more entry fields that each accept a developer credential of a set of developer credentials and with an entry field that accepts a first set of script commands; receiving a first developer credential of the set of developer credentials and the first set of script commands; wherein the first set of script commands include a first dummy credential of the set of dummy credentials; instantiating an executor instance that executes a browser; accessing, by the browser, a second page from the information server using a first credential of the set of user credentials; rendering, by the browser, the second page with a first dummy credential of the set of dummy credentials that is mapped to the first user credential of the set of user credentials; and transmitting a third page to the developer machine, the third page including a section that displays the second page rendered by the browser with the first dummy credential.

In general, in one or more aspects, the invention relates to a system for substituting credentials that includes a computer processor; a memory; a set of instructions in the memory that when executed by the computer processor cause the computer processor to perform the steps of generating a response to a request associated with access to an information server, the response including a first page with one or more entry fields that each accept a developer credential of a set of developer credentials and with an entry field that accepts a first set of script commands; receiving a first developer credential of the set of developer credentials and the first set of script commands; wherein the first set of script commands include a first dummy credential of the set of dummy credentials; instantiating an executor instance that executes a browser; accessing, by the browser, a second page from the information server using a first credential of the set of user credentials; rendering, by the browser, the second page with a first dummy credential of the set of dummy credentials that is mapped to the first user credential of the set of user credentials; and transmitting a third page to the developer machine, the third page including a section that displays the second page rendered by the browser with the first dummy credential.

Other aspects of the invention will be apparent from the following description and the appended claims.

BRIEF DESCRIPTION OF DRAWINGS

FIGS. 5A, 5B, 5C, 5D, 5E, 5F, 5G, 5H, and 5I show an example in accordance with one or more embodiments of the present disclosure.

DETAILED DESCRIPTION

Figure 1:
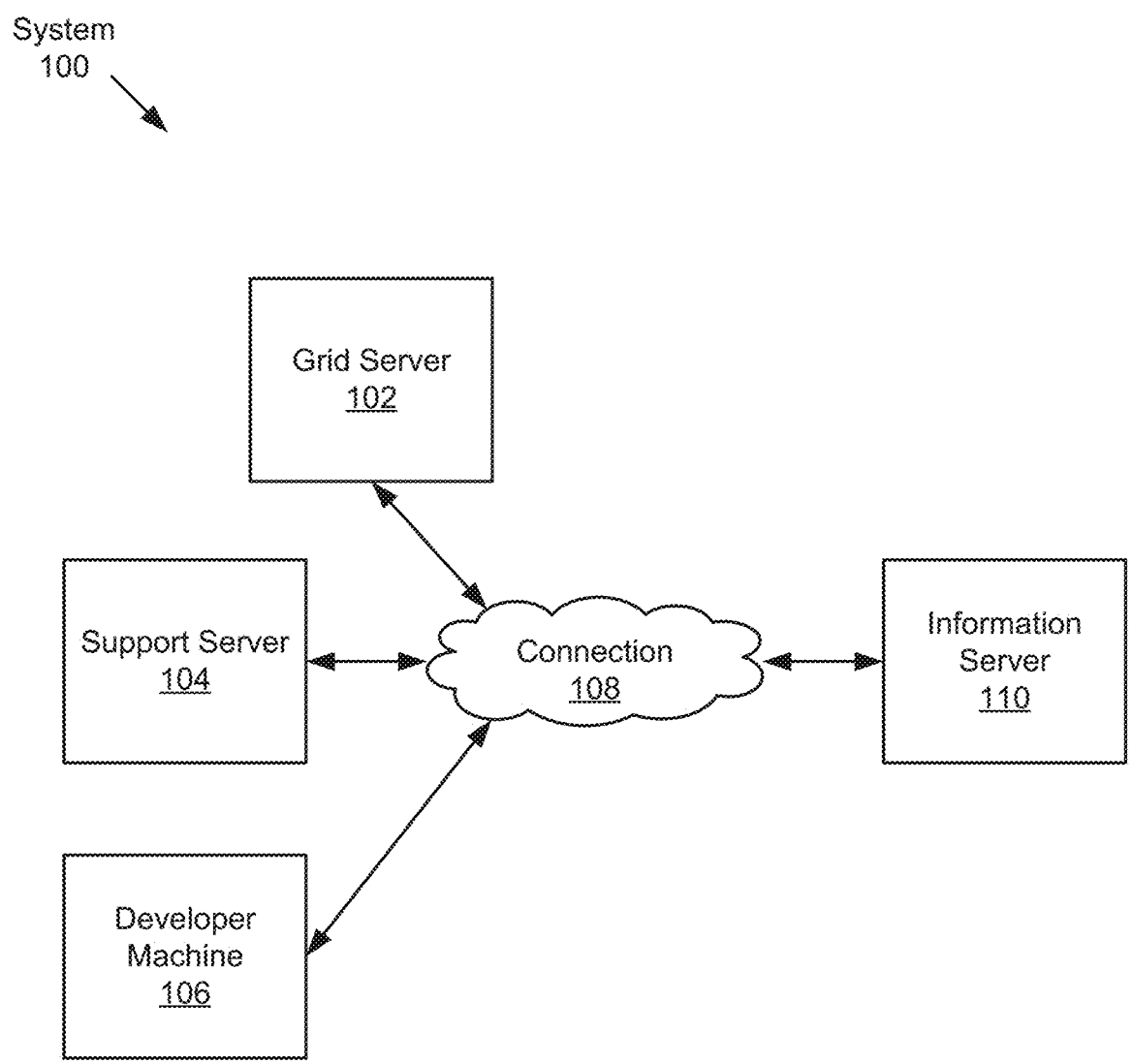
FIG. 1 shows a system in accordance with one or more embodiments of the present disclosure.

Specific embodiments of the disclosure will now be described in detail with reference to the accompanying figures. Like elements in the various figures are denoted by like reference numerals for consistency.

In the following detailed description of embodiments, numerous specific details are set forth in order to provide a more thorough understanding of the disclosure. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention allow for the development and maintenance of scripts that scrape information from information servers without allowing user credentials and personally identifying information to be transmitted to the developer machine. Technological problems of prior systems and methods include the transmission of user credentials and personally identifying information to a developer machine to allow the developer to generate scripts to scrape information from an information server. Allowing the developer to have access to the user credentials and personally identifying information is a security risk for the user. One or more embodiments in accordance with the present disclosure provide a technological solution that masks and substitutes the personally identifying information and the user credentials. The masking and substitution prevents access to the personally identifying information and the user credentials by the developer using the developer machine.

FIG. 1 shows a system (100) in accordance with one or more embodiments of the present disclosure. As shown in FIG. 1, the system (100) includes multiple components such as a grid server (102), a support server (104), a developer machine (106), and an information server (110). Each of the aforementioned servers (102, 104, 110) and the developer machine (106) may correspond to one or more physical or virtual computing devices (e.g., personal computer (PC), tablet PC, server, smart phone, kiosk, etc.). Additionally or alternatively, each server (102, 104, 110) and the developer machine (106) may correspond to software modules executing on one or more computing devices.

Still referring to FIG. 1, the grid server (102), the support server (104), the developer machine (106), and the information server (110) are linked by a connection (108). The connection (108) may correspond to a network of any size including wired and/or wireless segments (e.g., a local area network (LAN), the Internet, cellular network, etc.). Additionally or alternatively, the connection (108) may correspond to a bus on a single computing device.

In one or more embodiments, the grid server (102), the support server (104), the developer machine (106), and the information server (110) exchange messages via the connection (108). These messages may be transmitted by any one of the connected devices to invoke execution of a function or continue execution of a function. Both the content of the messages (e.g., payload) and the order of the messages are important in correctly executing the function. For example, the payload may identify the function that should be executed and/or parameters that should be used to execute the function. As another example, to accomplish a task correctly, function A should be executed before function B. Accordingly, the message to invoke execution of function A should be ordered before the message to invoke execution of function B.

Figure 2:
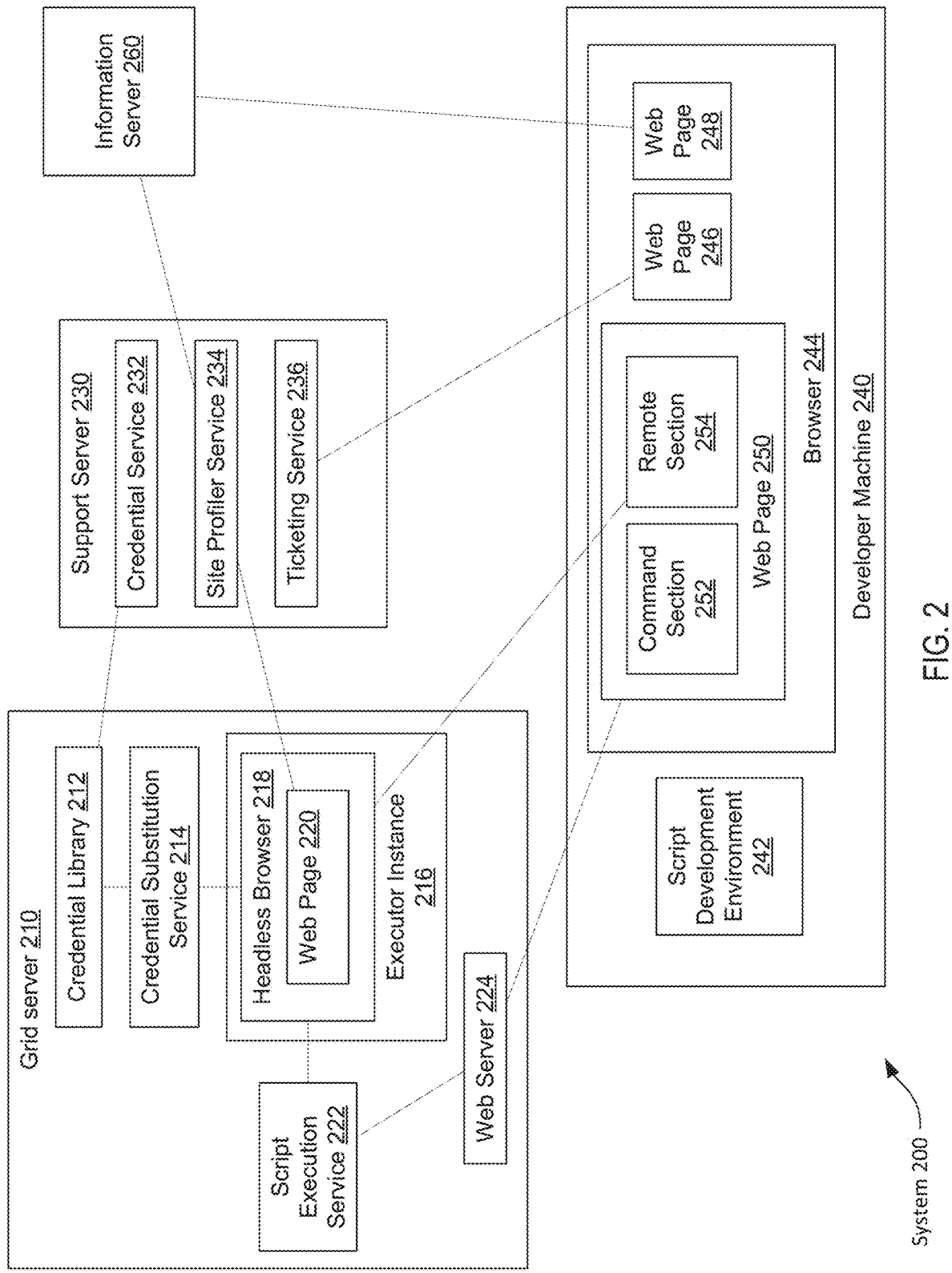
FIG. 2 shows a system and components of the system in accordance with one or more embodiments of the present disclosure.

FIG. 2 shows a system (200) in accordance with one or more embodiments of the present disclosure. Each device (210, 230, 240, 260) of the system (200) includes one or more components, modules, and services as described.

In one or more embodiments, the grid server (210) includes a credential library (212), a credential substitution service (214), an executor instance (216), a script execution service (222), and a web server (224). Alternative or additional embodiments may have one or more of these services provided by the support server (230). After receiving a request associated with accessing the information server (260) from the developer machine (240), the grid server (210) updates the credential library (212), instantiates an executor instance (216), and returns a response to the request.

In one or more embodiments, the credential library (212) is a software program, service, or module that stores a mapping of developer credentials, user credentials, and/or dummy credentials. The credentials and mapping are provided by the credential service (232) of the support server (230).

In one or more embodiments, the developer credentials are a set of credentials that uniquely identify the developer that is developing the script to scrape information from the information server (260). The developer credentials include a username and a password.

In one or more embodiments, the user credentials are a set of credentials that uniquely identify the user of the information server (260), e.g., the customer of a bank that uses the information server (260). In one or more embodiments, the user credentials include a username, a password, a set of question and answer keys, and/or a set of account keys. The set of question and answer keys include questions that are provided by the information server (260) to further verify the user and include the answers for the respective questions. The account keys provide additional security for accessing the information server (260).

In one or more embodiments, the dummy credentials are a set of credentials that are mapped to one or more of the user credentials. Each dummy credential is a text string that is to be replaced with an actual user credential text string when accessing the information server (260). The dummy credentials are used by the developer in place of the actual user credentials to prevent the developer from knowing the actual user credentials.

In one or more embodiments, the credential substitution service (214) is a software program, service, or module that does a two way substitution of the user credentials and the dummy credentials. Dummy credentials provided by the developer with the developer machine (240) are substituted with the user credentials to access the information server (260). Information from the information server (260) that corresponds to the user credentials is substituted for the dummy credentials prior to rendering the information from the information server (260).

In additional or alternative embodiments, the credential substitution service (214) performs a one way substitution that substitutes the dummy credentials for the user credentials when accessing the information server. Any user credentials that are present in the response from the information server are masked by the site profiler service (234) to prevent the user credentials from being transmitted to the developer machine even though only a one way substitution is performed.

In one or more embodiments, the executor instance (216) is a virtual machine or container framework that executes a browser (218). The executor instance (216) is instantiated after the developer selects a ticket and after the dummy credentials are created. The developer selects a ticket from the ticketing service (236) of the support server (230) using the developer machine (240). The dummy credentials are created by the credential service (232) of the support server (230).

In one or more embodiments, the browser (218) is a normal web browser that renders hypertext markup language (HTML) with styling elements that include page layout, color, font selection and the execution of a scripting language, such as JavaScript. In one or more embodiments, the browser (218) renders a web page (220) with the dummy credentials and masked information, accesses the information server (260) with the user credentials, and is controlled and operated by the developer machine (240) and the script execution service (222). In one or more embodiments, the grid server (210) does not include a directly attached screen to display the web page (220) rendered by the browser (218).

In one or more embodiments, the browser (218) renders the web page (220) with the dummy credentials by having the credential substitution service (214) replace the user credential text strings with the dummy credential text strings for information received from the information server (260). The masked information is information that was returned by the information server (260) but identified as being personally identifying information by the site profiler service (234) and then masked by the site profiler service (234) with random information. Examples of personally identifying information include a real name of the user, a physical address of the user, an account balance of the user, etc.

In one or more embodiments, the browser (218) accesses the information server (260) with the user credentials by having the credential substitution service (214) replace the dummy credential text strings with the user credential text strings. The replacement is performed for information sent to the information server (260) from the browser (218) on the executor instance (216).

In one or more embodiments, the browser (218) may be controlled and operated by the developer machine (240) and the script execution service (222). The browser (218) may be controlled by the developer machine (240) in response to keyboard and mouse commands that are passed through a virtual network computing (VNC) connection between the grid server (210) and the developer machine (240). The browser (218) may be operated by the script execution service (222), which converts script commands into browser commands that are executed by the browser (218).

Continuing with FIG. 2, the web page (220) is requested by the browser (218) and is received from the information server (260) after passing through the site profiler service (234). The web page (220) is a modified version of the information that would be received from information server (260). The web page (220) is modified to have personally identifying information replaced with random information. The web page (220) may be further modified to have the user credential information replaced by the dummy credential information before being rendered.

In one or more embodiments, the script execution service (222) is configured to convert script commands into browser commands. In one or more embodiments, the script commands are structured according to the JavaScript Object Notation (JSON) format. The script commands (also referred to as JSON commands) operate the browser (218) to cause interaction between the browser (218) and the information server (260). Commands in the scripts executed by the script execution service (222) include any command that can be performed by the browser (218), including commands for: scrolling a view, activating buttons, inputting text into a text field, selecting links, and requesting resources with a uniform resource locator (URL).

In one or more embodiments, the web server (224) serves the web page (250) from the grid server (210) to the developer machine (240). In one or more embodiments, the web server (224) handles dynamic page creation and other calls and requests that are required by the web page (250). The web server (224) receives script commands, which the developer provides by inputting the script commands into the web page (250). The script commands are passed to the script execution service (222) to operate the browser (218).

In one or more embodiments, the support server (230) provides the credential service (232), the site profiler service (234), and the ticketing service (236). Alternative or additional embodiments may include one or more of these services provided by the grid server (210).

Continuing with FIG. 2, the credential service (232) creates the mapping between the user credentials, developer credentials, and the dummy credentials. In one or more embodiments, the dummy credentials and the mapping are created in response to a developer activating a ticket provided by the ticketing service (236). The dummy credentials are associated with a time limit that is sufficient for the developer to resolve the ticket. In one example, the time limit may be fifteen minutes, while another example of a time limit is 45 seconds.

In one or more embodiments, the site profiler service (234) masks personally identifying information that is provided by the information server (260) and screens requests for access to the information server (260). In one or more embodiments, the personally identifying information is identified using string matching algorithms. In one example, a string (or substring) is compared to the Portable Operating System Interface (POSIX) compliant regular expression, such as:

\$[1-9]([0-9,.])*

When the string matches the expression, one or more of the digits in the string are replaced with random digits that are different from the original digits in the string. The regular expression is overly inclusive to catch strings that are not properly formatted by the information server (260). In alternative or additional embodiments, digits to the left of the decimal point may be added or removed to further obfuscate the information.

Continuing with FIG. 2, the site profiler service (234) screens requests for access to the information server (260) by scanning the URLs in the access requests provided by the browser 218. Several rules are defined to identify improper URLs. In one or more embodiments, the rules include, for example, a rule for a maximum string length of the URL, a rule for a maximum number of forward slashes in the URL, and rules for specific strings or substrings within the URL. When a rule is not followed, e.g., the string length of the URL is greater than the maximum allowed string length, access to the URL is denied and the request is not forwarded to the information server (260). When access is denied, an error message is provided that states that the request could not be completed.

In one or more embodiments, the ticketing service (236) provides access to a database of tickets. In one or more embodiments, a ticket identifies an issue submitted by a user for which a script needs to be developed or maintained. The ticket aggregates information related to a script being developed or maintained. The ticket includes a direct URL for accessing the information server (260), a logon URL for the information server (260), user credentials, user account information that includes account information that is accessible with the information server (260), and error information that describes why the ticket was submitted by the user.

In one or more embodiments, the developer machine (240) provides access to a script development environment (242) and a browser (244). The script development environment (242) is an integrated development environment (IDE), such as Eclipse, that is used by the developer to write and debug the scripts used to access and scrape the information provided by the information server (260).

In one or more embodiments, the browser (244) runs and executes one or more web pages (246, 248, 250). The first web page (246) of browser (244) is used to access the ticketing service (236) and is used by the developer to identify the ticket and script that will be addressed and developed. The second web page (248) is provided by the information server (260) in response to requesting the resource identified by the logon URL from the ticket. The third web page (250) is provided by the grid server (210), which will facilitate and provide limited access to the information server (260).

After logging into to the grid server (210), the third web page (250) of browser (244) includes a command section (252) and a remote section (254). The command section (252) accepts text input that is structured as one or more script commands. The text is transferred to the web server (224), which sends the commands to the script execution service (222), which converts the commands to browser commands, which are transferred to and executed by the browser (218).

In one or more embodiments, the remote section (254) of the web page (250) interactively displays the web page (220) that is rendered by the browser (218) with the dummy credentials and the masked information. Mouse clicks and keyboard commands that are registered within the remote section (254) are sent to the browser (218). The browser (218) executes, and is remotely operated by, the mouse clicks and keyboard commands registered within the remote section (254).

In one or more embodiments, the information server (260) provides access to sensitive information, which includes personally identifying information and account balance information. The information server (260) is typically unaware and agnostic to the credential substitution performed by credential substitution service (214) of the grid server (210) and to the information masking performed by the site profiler service (234) of the support server (230).

Figure 3:
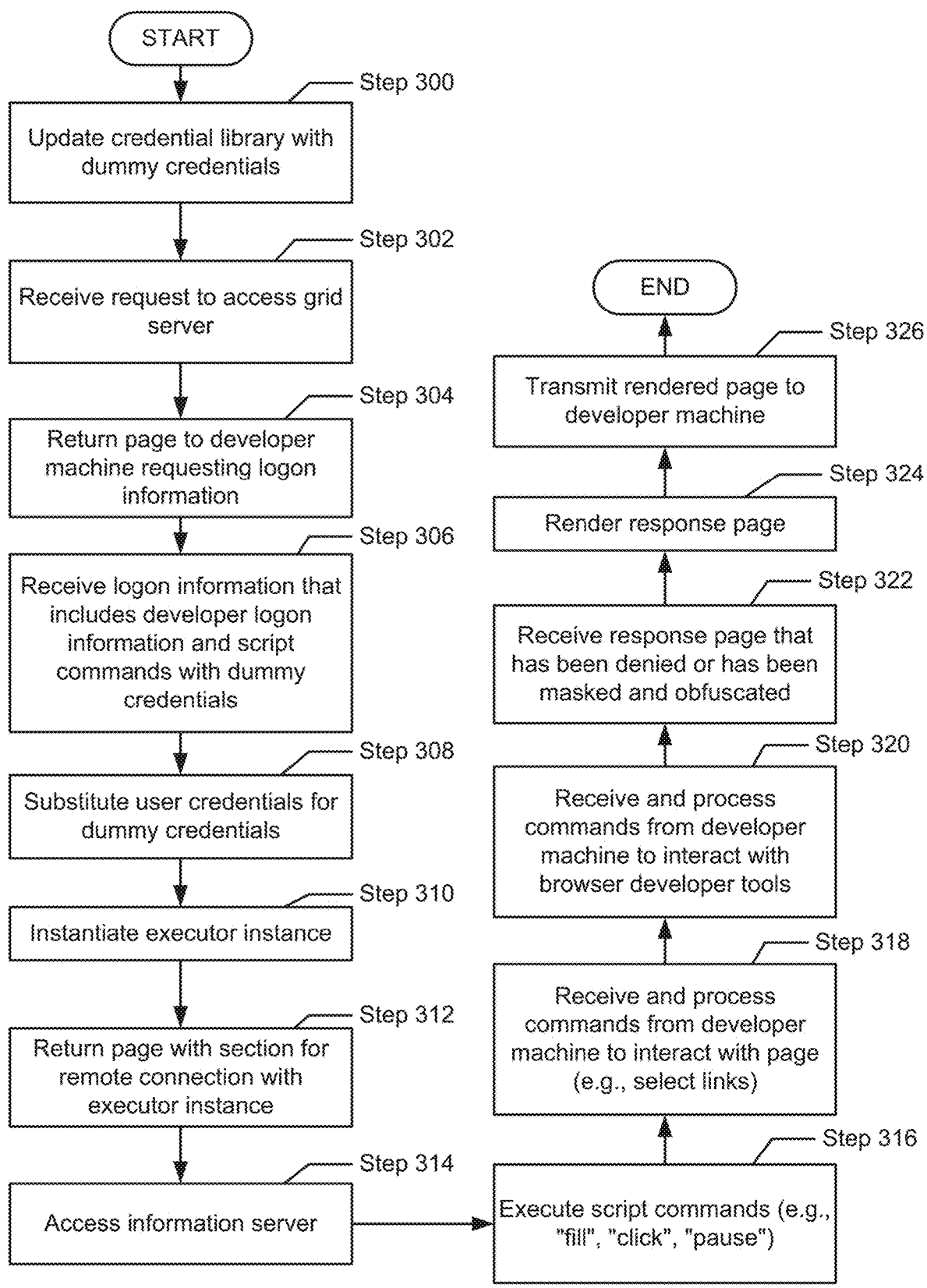
FIG. 3 shows a method for substituting credentials in accordance with one or more embodiments of the present disclosure.

FIG. 3 shows a flowchart in accordance with one or more embodiments of the present disclosure. The flowchart of FIG. 3 depicts a process for controlling access to sensitive information provided by a server. The process may be performed by one or more components of the grid server (102, 210), discussed above in reference to FIGS. 1 and 2. Moreover, some or all of the steps in FIG. 3 may be used to access an information server with user credentials while rendering content with dummy credentials and masked information. In one or more embodiments, one or more of the steps shown in FIG. 3 may be omitted, repeated, and/or performed in a different order than the order shown in FIG. 3. Accordingly, the scope of the present disclosure should not be considered limited to the specific arrangement of steps shown in FIG. 3.

In Step 300, a credential library is updated with dummy credentials. In one or more embodiments, the grid server maintains the credential Library and the dummy credentials are received from a support server that maintains a mapping between the dummy credentials, the developer credentials, and the user credentials. The mapping is generated after a ticket is selected with a developer machine. As previously described, the ticket aggregates information related to a script being developed or maintained and the ticket is maintained by a ticketing service of the support server.

In one or more additional or alternative embodiments, the credential library is not provided by the grid server. Instead, the grid server accesses a credential library maintained by another server, such as the support server, which performs the updates to the credential Library.

In Step 302, a request to access the grid server is received. The request is received by the grid server from a developer machine. In one or more embodiments, the request is in the form of a development URL that identifies the grid server.

In Step 304, a page is returned to the developer machine that requests logon information. The page is generated by a web server hosted by the grid server in response to the request for accessing the grid server.

In Step 306, logon information that includes developer logon information and script commands with dummy credentials is received. The logon information is received by the grid server from the developer machine in response to the page requesting the logon information. The developer logon information includes one or more developer credentials. The script commands may be JSON commands and the dummy credentials are the dummy credentials mapped to the developer credentials, such as a username and password. If the developer credentials are not recognized, if the dummy credentials do not match the developer credentials, or if the time limit for the dummy credentials has been reached, then the grid server will not process any further requests.

In one or more additional or alternative embodiments, different verification and authorization methods and techniques are employed. For example, instead of using developer credentials provided in the logon information, grid server may use a media access control (MAC) address from the headers of the access request. The grid server uses the MAC address to resolve the correct developer credentials and dummy credentials, which are mapped to the MAC address.

In one or more additional or alternative embodiments, individual commands are not provided in the logon information. The commands may be provided in a script that is identified with a uniform resource indicator (URI) or file and path names in the logon information.

In Step 308, user credentials are substituted for the dummy credentials. The user credentials are the user credentials that are mapped to the dummy credentials and stored in the credential library maintained by the grid server. The substitution is performed by a substitution service hosted by the grid server. The substitution is performed by replacing the text strings of the dummy credentials with the text strings of the user credentials that are mapped to the text strings of the dummy credentials.

In one or more additional for alternative embodiments, the credential substitution service is provided by a server that is external to the grid server. For example, support server may maintain the credential library and provide the credential substitution service to the grid server.

In Step 310, an executor instance is instantiated. The grid server instantiates the executor instance after verifying the developer credentials provided from the developer machine. The executor instance runs a browser that is used to access the information server.

In one or more additional or alternative embodiments, the executor instance may already be instantiated and waiting for commands from the grid server prior to verification of the developer credentials. Pre-instantiation of the executor instance reduces the load times experienced by the developer at the developer machine.

In Step 312, a page is returned with a section for a remote connection with the executor instance. The page is returned by the web server of the grid server after successful instantiation of the executor instance and the browser within the executor instance. The remote connection is a connection between the grid server and the developer machine that allows the developer machine to control the browser running on the executor instance through interaction with the section of the page for the remote connection.

The remote connection is provided using one or more programs and protocols that provide screen sharing and user input command sharing between the grid server and the developer machine. Programs include programs that use the VNC protocol and the remote desktop protocol (RDP).

In Step 314, the information server is accessed. The information server is accessed by the browser running on the executor instance hosted by the grid server. The browser accesses the information server with the logon URL that identifies a logon page of the information server and was stored in the selected ticket.

In Step 316, script commands are executed. In one or more embodiments, a script execution service of the grid server converts the script commands received from the developer machine to browser commands that are sent to and executed by the browser on the executor instance of the grid server. The script commands are used to traverse the logon page of the information server and to interact with the information server in order to scrape information provided by the information server. The script commands include a "fill" command to fill in a text input element of a page provided by the information server and rendered by the browser, a "click" command that provides a mouse click event to the page, and a "pause" command that waits for a specified amount of time before continuing, and a "visit" command that causes the browser to access a page identified with a URL.

Additional script commands are provided to control additional functionality provided by the browser and to provide additional input commands. Additional browser functionality includes opening and closing tabs, scrolling web pages, and selecting browser elements. Additional input commands include mouse movement and click events and keyboard key press events.

In Step 318, commands from the developer machine to interact with the page are received and processed. The commands include events related to human interface devices, such as mouse events, mouse clicks, mouse movements, keyboard events, keyboard keystrokes, etc. The events are passed to the browser on the executor instance through the remote connection and are executed by the browser, allowing the developer machine to interact with the web page loaded from the information server and rendered by the browser.

In Step 320, commands from developer machine to interact with browser developer tools are received and processed. In addition to interacting with the page rendered by the browser on the executor instance, the human interface device events (mouse clicks and keystrokes) can also interact with the browser to invoke the developer tools provided by the browser. In one or more embodiments, the developer tools of the browser include a command line or console interface, network waterfall diagrams, and source code viewers.

In Step 322, a response page is received that either shows that access has been denied or includes masked and substituted information. The response page is received in response to the browser on the executor instance requesting access to additional information from the information server under the control of the developer machine. Access is denied when the request is identified as violating one or more rules that are used to restrict access to the information provided by the information server, as discussed above with the site profiler service (234) of FIG. 2. When access is granted, information returned by the information server is masked and substituted prior to being rendered by the browser. A site profiler service masks personally identifying information (including account balance information) and the credential substitution service substitutes the user credential information for the dummy credential information.

In Step 324, the response page is rendered. If access was denied, then the response page is an error page that indicates the access was denied. If access was granted, the browser on the executor instance renders the response page with one or more of the masked information and the substituted information. The masked information masks and obfuscates personally identifying information that is included in the response page. The substituted information is the dummy credential information that is substituted for the user credential information provided in the response page.

In Step 326, the rendered page is transmitted to the developer machine. The page is rendered by the browser on the executor instance and includes masked information and substituted information. The page is transmitted to the developer machine over the remote connection between the developer machine and the grid server.

FIGS. 4A through 4E show a sequence diagram in accordance with one or more embodiments of the present disclosure. The sequence diagram of FIGS. 4A through 4E depicts a sequence of events of a process for controlling access to sensitive information provided by a server. The process may be performed by one or more devices and components (402, 404, 406, 408), which correspond to the devices of the systems (100, 200) discussed above in reference to FIGS. 1 and 2. In one or more embodiments, one or more of the steps and events shown in FIGS. 4A through 4E may be omitted, repeated, and/or performed in a different order than the order shown in FIGS. 4A through 4E. Accordingly, the scope of the present disclosure should not be considered limited to the specific arrangement shown in FIGS. 4A through 4E.

Figure 4A:
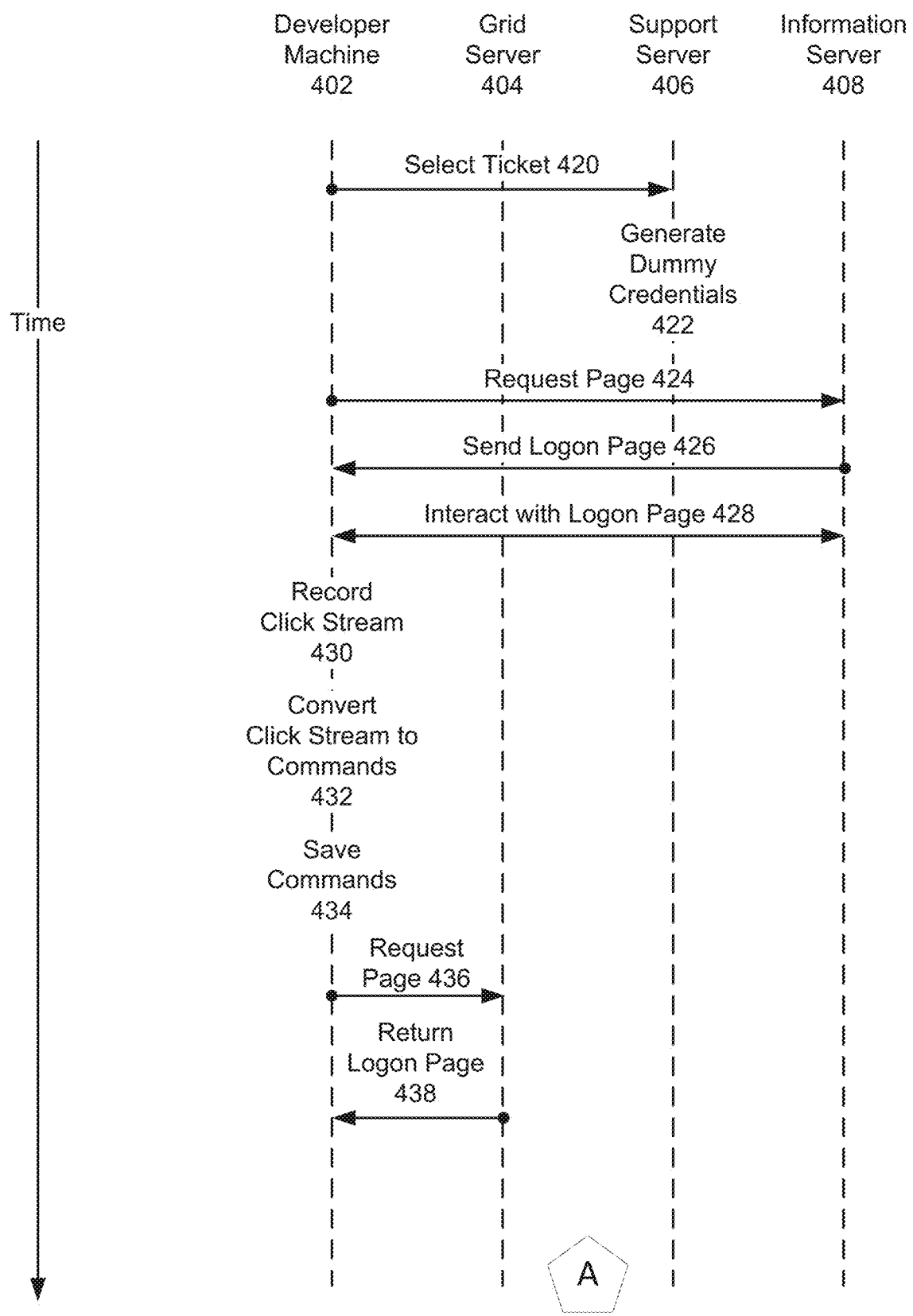
FIGS. 4A, 4B, 4C, 4D, and 4E show an example in accordance with one or more embodiments of the present disclosure.

Referring to FIG. 4A, in Step 420, the selection of a ticket is transmitted from the developer machine (402) to the support server (406). Selection of the ticket is performed by interaction of the developer machine (402) with a web page provided by the support server (406). The page provided by the support server (406) enumerates one or more tickets that are available for selection and are associated with scripts needing development or maintenance. In additional or alternative embodiments, the ticket maybe automatically selected or assigned buy the support server. When automatically selected or assigned, the support server may use a priority queue to identify the order of available tickets and the developer to which each ticket is assigned.

In Step 422, dummy credentials are generated by the support server (406). In one or more embodiments, the support server (406) maps the dummy credentials to user credentials and to developer credentials associated with the selected ticket after, and in response to, the ticket being selected. The support server (406) includes a time limit for the dummy credentials that limits how long the dummy credentials may be used. In additional or alternative embodiments, the grid server (404) may generate and maintain the dummy credentials.

In Step 424, a page is requested by the developer machine (402) from the information server (408). The page is requested by a browser running on the developer machine (402). The request is for a resource associated with the logon URL identified in the selected ticket. In additional or alternative embodiments, the request may be automatically created by the developer machine (402) when the ticket is selected.

In Step 426, a logon page is sent from the information server (408) to the developer machine (402). The logon page is sent in response to the request from the developer machine (402) and requires a set of credentials that can be verified by the information server (408) before allowing additional access to the information server (408).

In Step 428, the developer machine (402) interacts with the logon page. In one or more embodiments, the interaction traverses the logon page by entering random credential information and requesting verification. The random credentials are unrelated to the developer credentials, the user credentials, and the dummy credentials and the successful verification of the random credentials by the information server (408) is not required. The random credentials are provided to capture the events that are required to traverse past the logon page provided by the information server (408) to access the data that needs to be scraped from the information server (408).

In additional or alternative embodiments, the initial interaction to traverse the logon page may already be a working part of a script. When the logon traversal is already correct, the script may be specified in log on information that is transmitted to the grid server (404) at Step 442 and Steps 428 through 438 may be omitted.

In Step 430, a click stream is recorded by the developer machine (402). The click stream is the sequence of user input events (e.g., mouse clicks, mouse movements, keyboard input, etc.) that occur during the interaction with the logon page by the developer machine (402). In one or more embodiments, the click stream is recorded with a plugin that is installed into the browser of the developer machine (402).

In Step 432, the click stream is converted to commands by the developer machine (402). In one or more embodiments, the commands are formed according to the JSON standard and may be incorporated into the script that is being developed to scrape data from the information server (408).

In Step 434, the commands are saved by the developer machine (402). In one or more embodiments, the JSON commands generated from the click stream are saved to a script file edited by the developer using the developer machine (402). Additional or alternative embodiments may use other scripting languages and protocols.

In Step 436, a page is requested from the grid server (404) by the developer machine (402). In one or more embodiments, the request is made by a browser running on the developer machine (402) attempting to access the resource identified by the development URL that identifies the grid server (404). In additional or alternative embodiments, the request to the information server (408) may be directly from the developer machine (402) and intercepted by the grid server (404) or the support server (406).

In Step 438, a logon page is returned by the grid server (404) to the developer machine (402). In one or more embodiments, the logon page includes fields for developer credentials and script commands. Additional or alternative embodiments may accept a file and path name or URI for a script file in addition to or instead of the script commands.

Figure 4B:
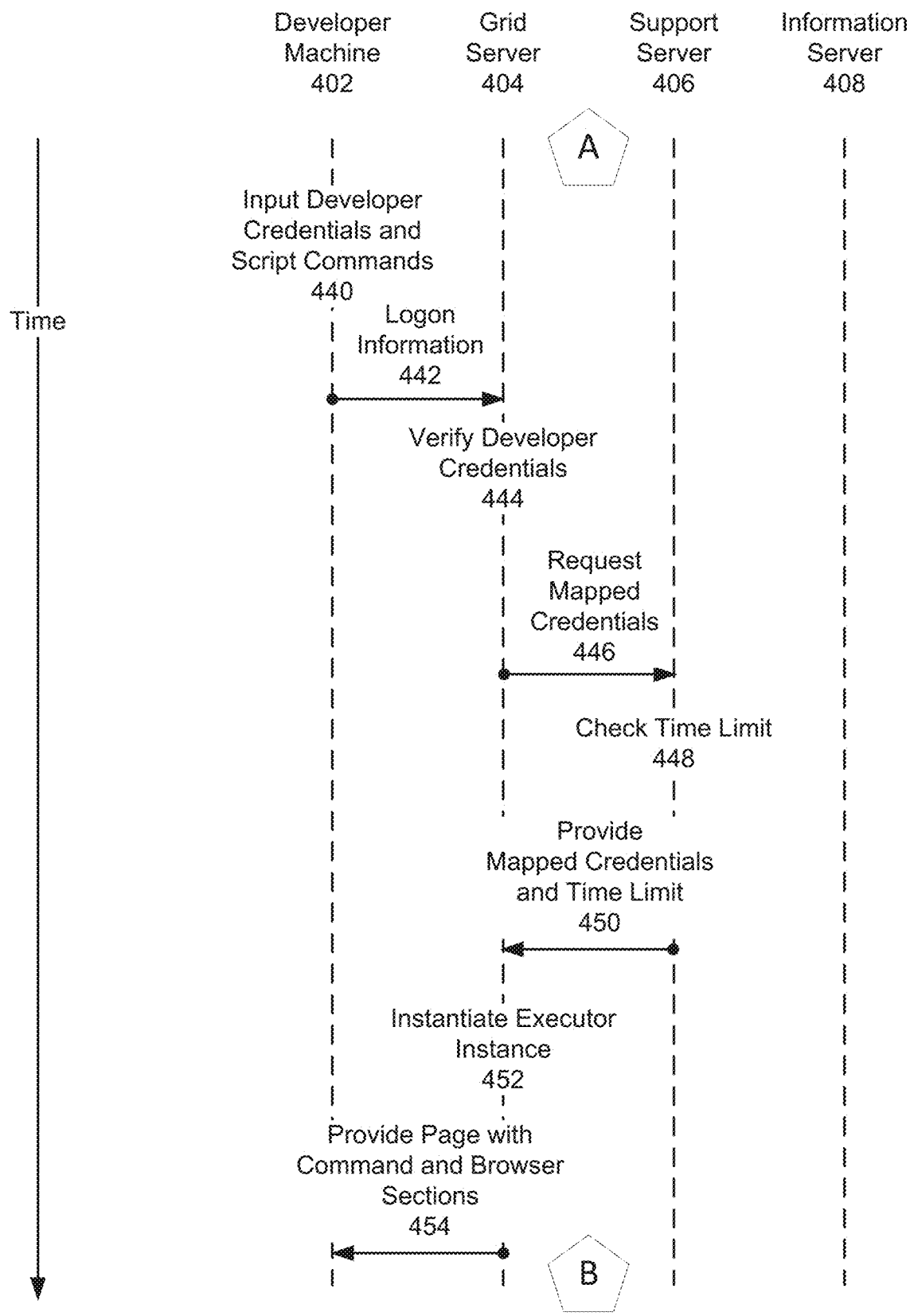

Referring to FIG. 4B, in Step 440, the developer machine (402) is used to input logon information. In one or more embodiments, the logon information includes the developer credentials and the script commands. The developer credentials may include a username and a password of the developer. The script commands may include one or more commands that were captured and converted from the click stream. The script commands may also include dummy credential information that replaces the random credential information used while the click stream was being captured.

In Step 442, the logon information is transmitted from the developer machine (402) and is received by the grid server (404). In one or more embodiments, the logon information includes the developer credentials and includes the script commands used to traverse the logon page of the information server (408). The script commands include the logon URL for the information server (408).

In Step 444, the developer credentials are verified by the grid server (404). In one or more embodiments, the grid server (404) verifies the information in the developer credentials against credential information from a credential library.

In Step 446, the grid server (404) transmits a request for mapped credentials to the support server (406). In one or more embodiments, the request includes the developer credentials from the logon information, which were mapped by the support server (406) to the dummy credentials after being generated (Step 422). In additional or alternative embodiments, the grid server maintains the credential mapping and Steps 446 through 450 can be omitted.

In Step 448, the time limit is checked by the support server (406). In one or more embodiments the time limit was set when the dummy credentials were generated (Step 422). If the time limit is exceeded, then the dummy credentials are expired and is not provided by the support server (406).

In Step 450, the mapped credentials and the time limit are transmitted from the support server (406) to the grid server (404). The mapped credentials include the dummy credentials that are mapped to the developer credentials.

In Step 452, an executor instance is instantiated by the grid server (404). In one or more embodiments, the executor instance runs a browser that is controlled by script commands, is controlled by commands from the developer machine (402), and accesses the information server (408). The grid server (404) monitors the time limit for the dummy credentials and terminates the executor instance if the time limit is exceeded. The executor instance is terminated to prevent excessive access to the information provided by the information server (408).

In Step 454, a page is provided by the grid server (404) to the developer machine (402). In one or more embodiments, the page includes a command section and a browser section. The command section of the page accepts textual input for one or more JSON formatted script commands that control the browser running on the executor instance. The browser section is a remote browser section of the page and displays a rendering of the page performed by the browser of the executor instance. The remote browser section is connected to the browser on the executor instance through a VNC connection so that human interface device events (mouse clicks, keyboard commands, etc.) from the developer machine (402) that interact with the remote browser section are passed along to the browser running on the executor instance in the grid server (404).

Figure 4C:
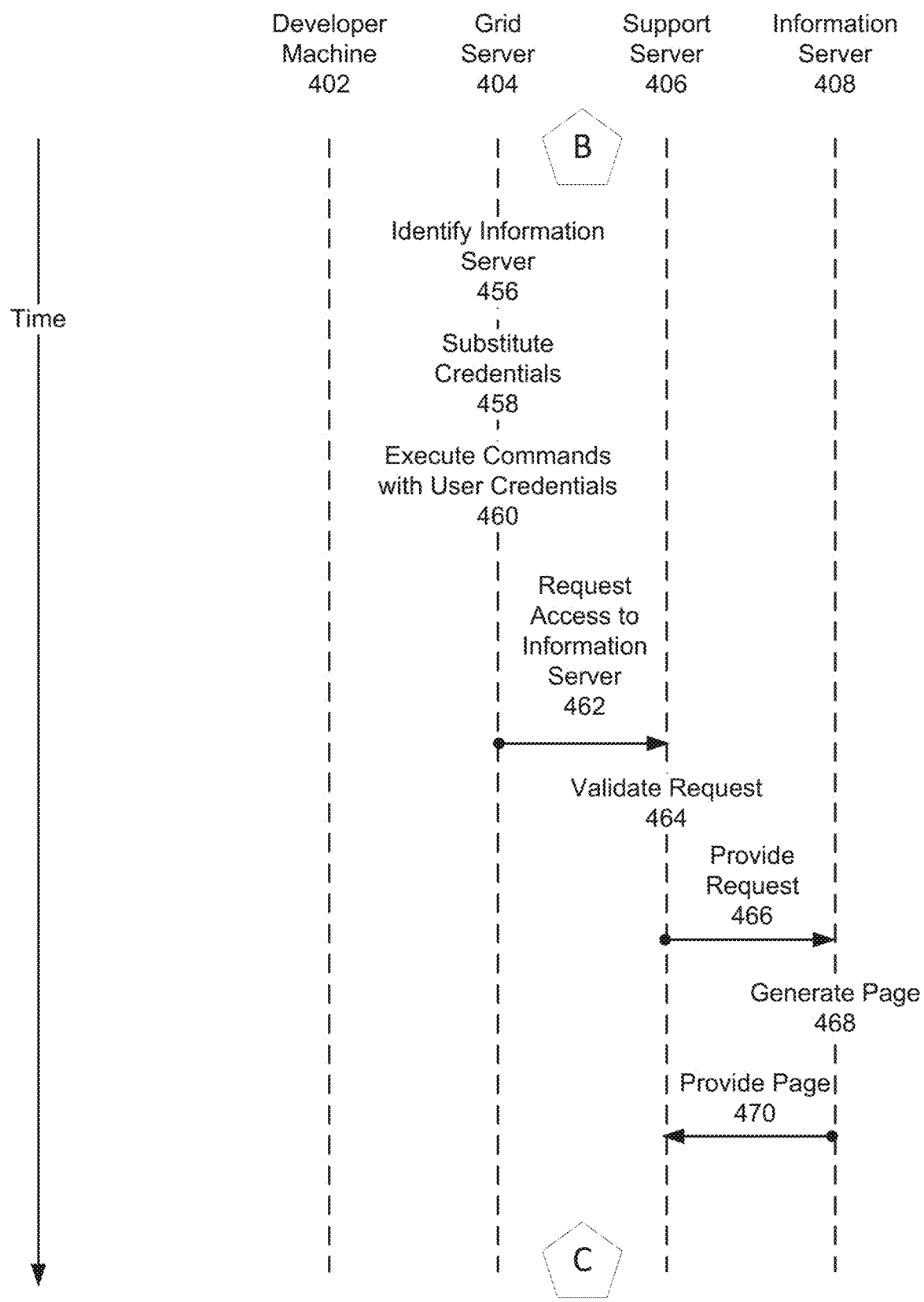

Referring to FIG. 4C, in Step 456, the grid server (404) identifies the information server (408). In one or more embodiments, the information server (408) is identified in one of the script commands entered into the logon page that was provided by the grid server (404).

In Step 458, credentials are substituted. In one or more embodiments, the grid server (404) substitutes the text strings of the dummy credentials from one or more commands with corresponding text strings from the user credentials that are mapped to the dummy credentials. The commands with dummy credentials include script commands provided in the logon information (Step 442). The commands also include commands that have been input to the command section of the page provided (at Step 454) by the grid server (404).

In Step 460, commands with the user credentials are executed by the grid server (404). In one or more embodiments, the commands are converted from script commands to browser commands, which are executed by the browser running in the executor instance in the grid server (404).

In Step 462, a request to access the information server (408) is transmitted from the grid server (404) to the support server (406). In one or more embodiments, the request includes the user credential information instead of the dummy credential information that was provided with the developer machine (402).

In Step 464, the support server (406) validates the request. In one or more embodiments, the request is validated by checking the URL of the request against one or more rules that are used to prevent improper access to the information server (408), as described above. Additionally, the support server (406) also checks the time limit to ensure that the request was not provided after the time limit has been exceeded. If the request is not validated, then the support server (406) provides an error page and does not transmit the request to the information server (408).

In Step 466, the request is provided by the support server (406) to the information server (408). In one or more embodiments, the request has been validated by the support server (406) and may include user credential information.

In Step 468, the information server (408) generates a page. In one or more embodiments, the page is generated in response to the request that is from the grid server (404), was made by the browser on the executor instance, and was validated by the support server (406). Depending upon the request, the page generated by the information server (408) may include user credential information and personally identifying information that should not be transmitted to the developer machine (402). Preventing the transmission of the user credential information and personally identifying information to the developer machine (402) maintains the security of the user, the user credentials, and the personally identifying information of the user.

In Step 470, the page is transmitted by the information server (408) and is received by the support server (406). In one or more embodiments, the page is generated by the information server (408) and includes one or more user credentials and personally identifying information.

Figure 4D:
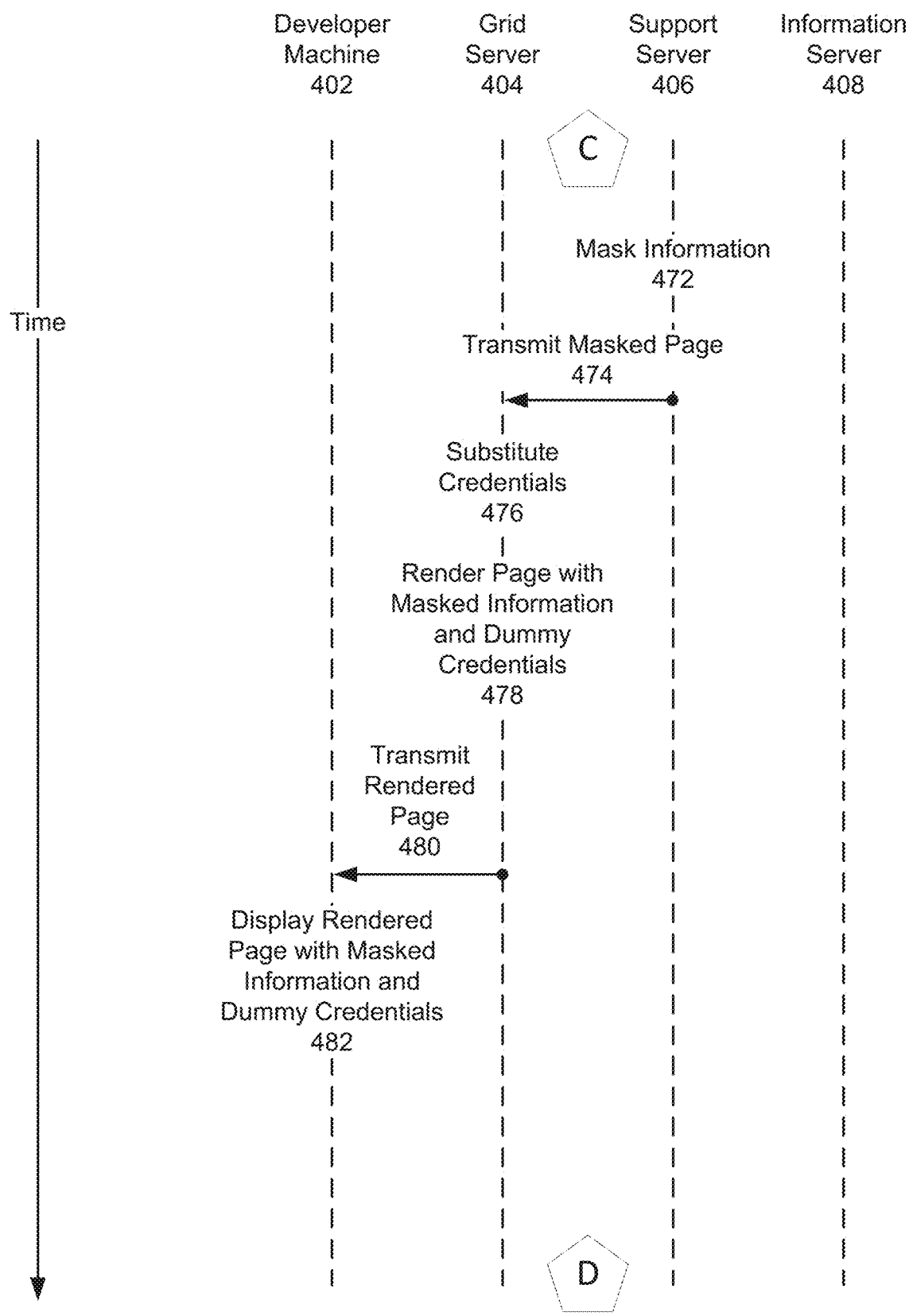

Referring to FIG. 4D, in Step 472, the support server (406) masks information. In one or more embodiments, the information masked by the support server (406) includes the personally identifying information that was provided in the page generated by the information server (408). As discussed above, the personally identifying information is masked by identifying the information using string comparisons and regular expressions. The information identified as personally identifying information is replaced with randomized information to generate a masked page. In alternative or additional embodiments, the support server (406) masks the user credentials in addition to masking the personally identifying information.

In Step 474, the masked page from the support server (406) is transmitted to and received by the grid server (404). In one or more embodiments, the masked page does not include the personally identifying information that was identified by the support server (406).

In Step 476, the credentials are substituted by the grid server (404). In one or more embodiments, the credential substitution service scans the masked page for information similar to the information contained in the user credentials. The user credential information is substituted with corresponding dummy credential information prior to rendering the masked page.

In Step 478, the page with masked information and dummy credentials is rendered by the grid server (404). In one or more embodiments, the page is rendered by the browser running on the executor instance within the grid server (404).

In Step 480, the rendered page is transmitted from the grid server (404) to the developer machine (402). In one or more embodiments, the rendered page is transferred over the VNC connection. The rendered page does not include personally identifying information and does not include user credentials. The personally identifying information has been masked and the user credentials are substituted for the dummy credentials.

In Step 482, the rendered page with the masked information and the dummy credentials is displayed by the developer machine (402). In one or more embodiments, the rendered page is displayed in the remote browser section of the page from the grid server (404) that was loaded by the browser running on the developer machine (402).

Figure 4E:
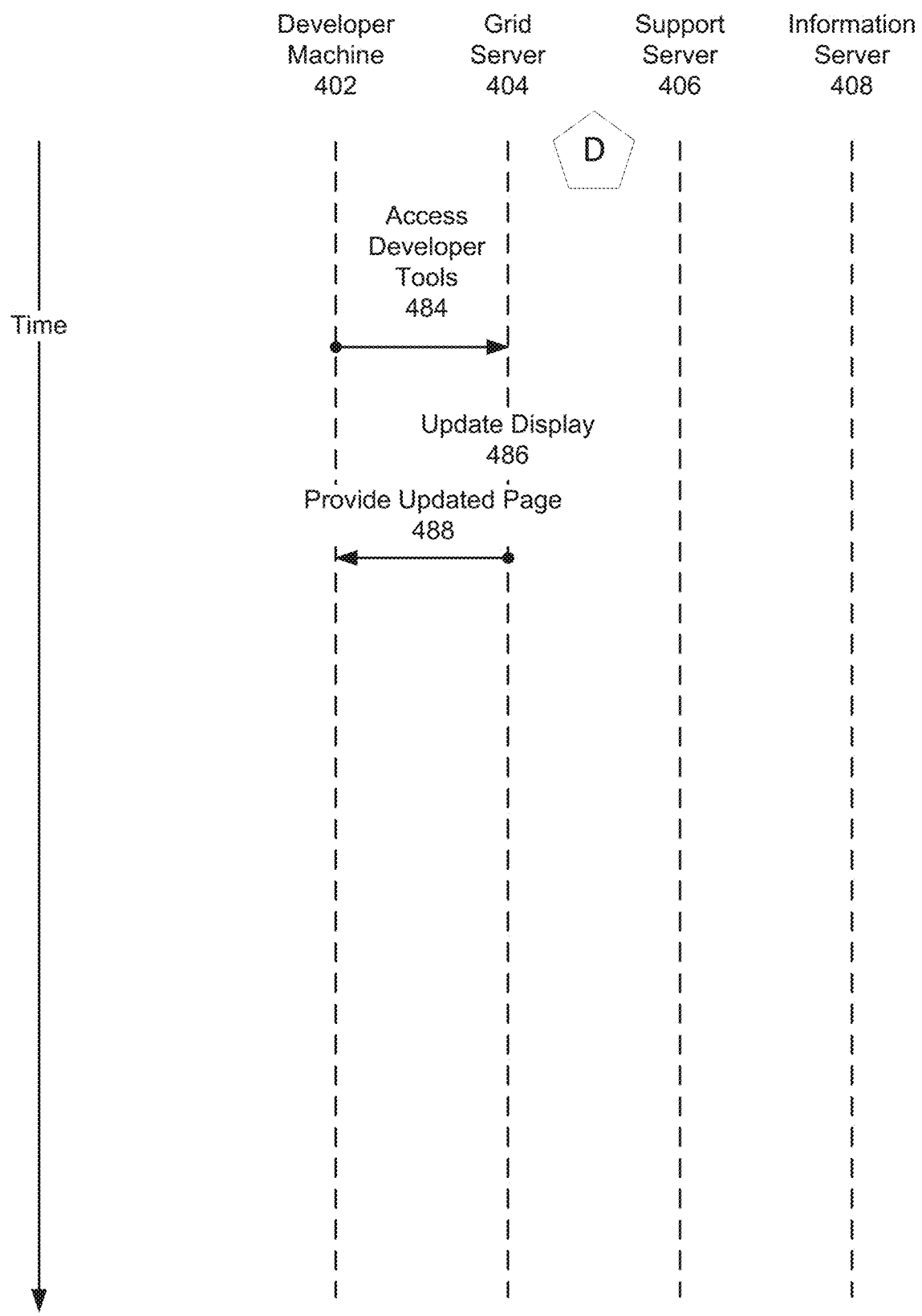

Referring to FIG. 4E, in Step 484, developer tools of the browser on the executor instance of the grid server (404) are accessed by the developer machine (402). In one or more embodiments, the developer tools are accessed to identify the location of an element within a document object model (DOM) of the rendered page.

In Step 486, the display of the rendered page is updated by the browser of the grid server (404). In one or more embodiments, the display is updated to show one or more developer tools, including a JavaScript console and a tree view of the elements of the DOM for the rendered page.

In Step 488, the updated page is provided by the grid server (404) to the developer machine (402). In one or more embodiments, the updated page includes a display of the rendered page along with display of the developer tools.

FIGS. 5A through 5I show a user interface of a developer machine in accordance with one or more embodiments of the present disclosure. The user interface of FIGS. 5A through 5I is used to develop scripts that access sensitive information server without displaying the sensitive information provided by the information server. The display of sensitive information is withheld by one or more processes and methods performed by one or more devices and components that correspond to the devices of the systems (100, 200) discussed above in reference to FIGS. 1 and 2. In one or more embodiments, one or more of the features, elements, steps, and events described with FIGS. 5A through 5I may be omitted, moved, repeated, and/or performed in a different order than that shown in FIGS. 5A through 5I. Accordingly, the scope of the present disclosure should not be considered limited to the specific arrangement shown in FIGS. 5A through 5I.

Figure 5A:
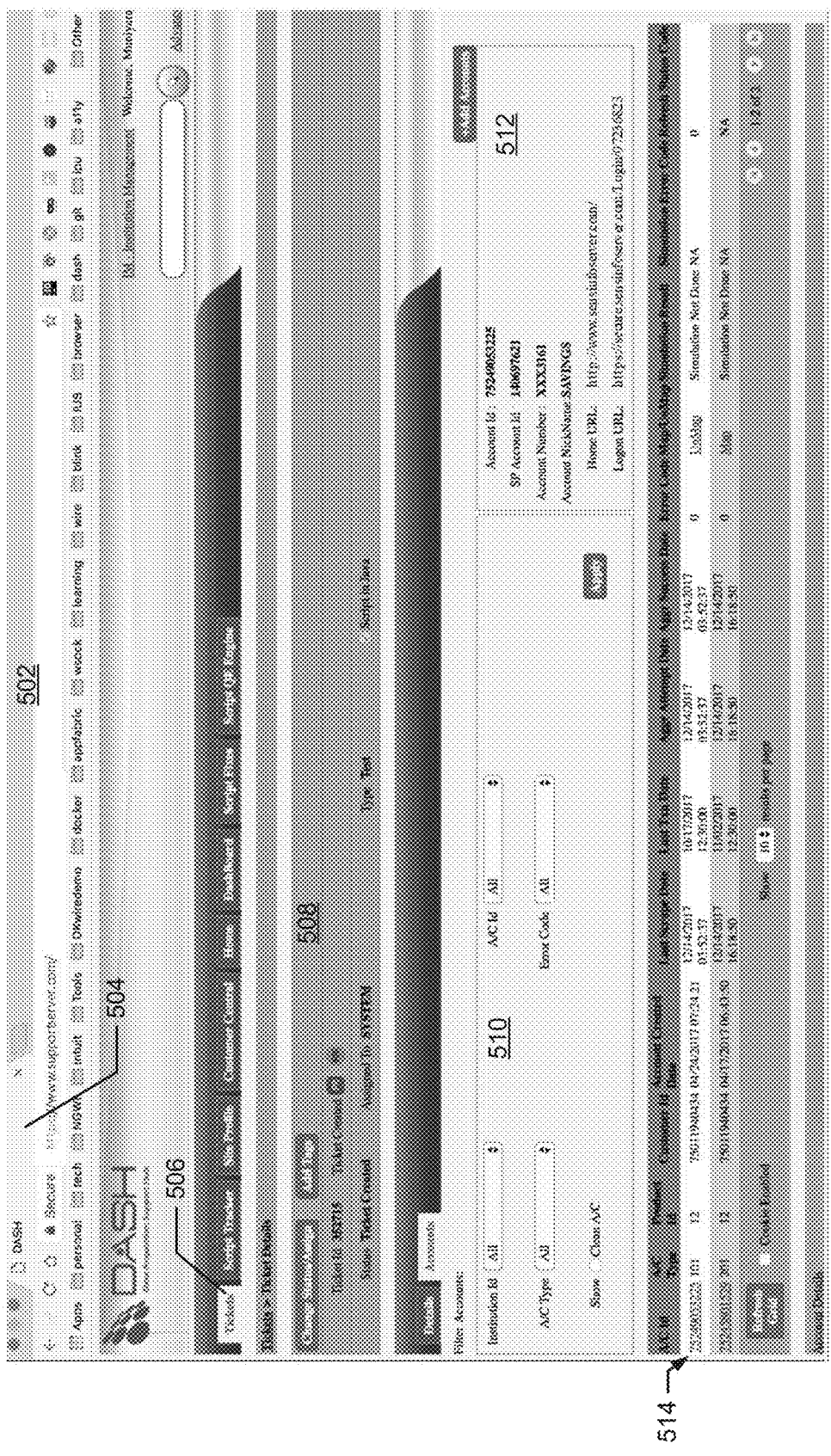

Referring to FIG. 5A, in one or more embodiments, a user interface (500) displays a browser (502) on a developer machine. The browser (502) includes a ticket tab (504) that displays a ticket page, which is a web page provided by a ticketing service of a support server. The information found on the ticket tab (504) is used by the developer to access an information server directly and to access the information server through a grid server.

In one or more embodiments, the ticket page includes a ticket information tab (506) that, when selected, provides information about a ticket that has been selected with the developer machine. The ticket information tab (506) includes a ticket information section (508), an account filtering section (510), a server information section (512), and an account table section (514).

In one or more embodiments, the ticket information section (508) displays information relevant to the ticket. The information in the ticket information section (508) includes an identifier for the ticket and a status of the ticket. In one or more embodiments, the identifier is a numerical identifier that is unique to a particular ticket. The status identifier is a human readable text string that identifies the status of the ticket.

In one or more embodiments, the account filtering section (510) displays one or more elements used to filter the accounts in the account table section (514) that are related to the selected ticket. The elements in the account filtering section (510) allow for selecting between different accounts, different error codes, and different institutions.

In one or more embodiments, the server information section (512) displays information related to an information server. The information server provides sensitive information that is to be scraped by the system for one or more of the accounts identified in the account table (514). Information within the server information section (512) includes a home URL that provides access to a front page of the information server and includes a logon URL that provides direct access to the logon page of the information server.

In one or more embodiments, the account table section (514) displays a listing of accounts related to the selected ticket and that have been filtered using the elements of the account filtering section (510). Each account in the account table section is displayed in a row of a table.

In one or more embodiments, to proceed with developing or maintaining the script identified by the ticket, the logon URL from the server information section (512) is selected and copied to the clipboard of the developer machine running the browser (502). The logon URL is then directly accessed by the developer machine by visiting the URL with a new tab in the browser (502).

Figure 5B:
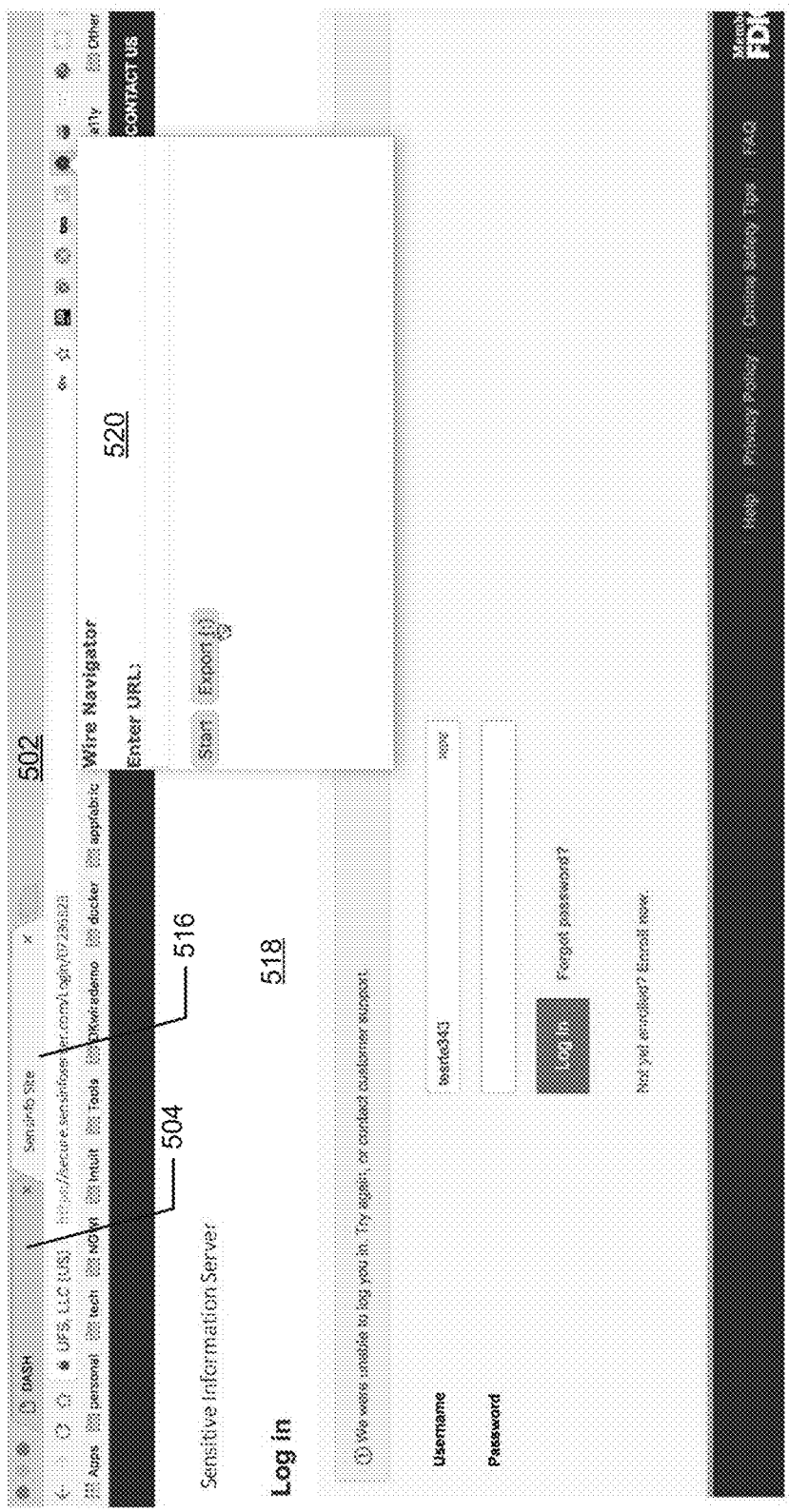

Referring to FIG. 5B, the user interface (500) is updated to show a new tab, the logon tab (516), that was used to directly access the logon page of the information server. The credential section (518) includes input fields for user credentials that include a username and a password and a login button to initiate the login process with the supplied user credentials.

In one or more embodiments, a random username was supplied without a password and then the login button was selected. Entering the username and clicking on the login button generates a click stream that is recorded by a plugin that has been installed on the browser (502).

In one or more embodiments, after clicking on the login button, the page was updated to include an error message. The error message indicates that the attempt to login to the information server using the random credentials (the random username with no password) was not successful.

In one or more embodiments, after the unsuccessful attempt to login, converter section (520) is opened and displayed. The converter section (520) converts the click stream recorded by the plugin to one or more script commands structured according to the JSON standard, also referred to as JSON commands or JSON formatted script commands. The JSON commands are copied to the clipboard of the developer machine.

In the depicted example, The JSON commands converted from the click stream include the following:

[
 {
 "action": "visit",
 "url":
"https://secure1.ufsdata.com/pbi_pbill51/Login/075906346"
 },
 {
 "action": "fill",
 "selector": "form>div>div>div>input"
 "value": "_placeholder_1_"
 },
 {
 "action": "fill",
 "selector": "div>form>div>div>input"
 "value": "_placeholder_2_"
 },
 {
 "action": "click",
 "selector": "div>form>div>div>button"
 },
]

The first command is a visit action and includes a URL. Upon execution of the visit action, the browser on the executor instance of the grid server will attempt to access the resource identified by the URL.

The second action is a fill action, which includes a selector and a value. The selector is a cascading style sheet (CSS) selector that can be used to search for and identify an element on the web page, which in this case is a username. The value is the text string that will be filled into the element identified by the selector. Upon execution of the fill action, the browser on the executor instance of the grid server will fill in the element identified by the selector with the value. Prior to execution, the value is updated from "_placeholder_1_" to an appropriate dummy credential.

The third action is another fill action that also includes a selector and a value. The selector for the third action identifies a password input field. Upon execution of the fill action, the browser on the executor instance of the grid server will fill in the element identified by the selector with the value. Prior to execution, the value is updated from "_placeholder_2_" to an appropriate dummy credential.

The fourth action is a click action that includes a selector. The selector of the click action identifies a button that will be clicked upon execution. In this case, button initiates the login process using the credentials provided in the username and password input fields.

Figure 5C:
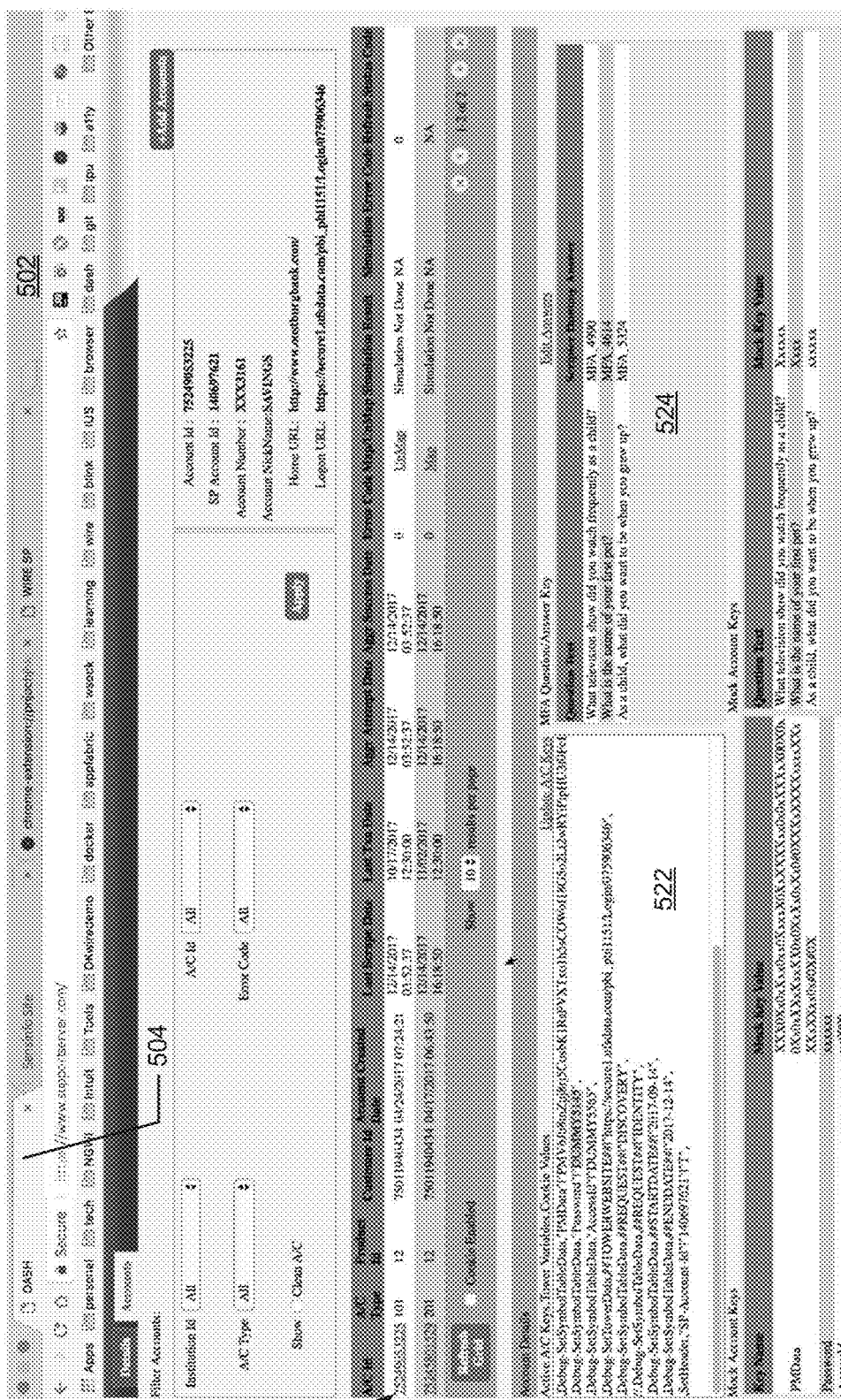

Referring to FIG. 5C, the user interface (500) is updated to show the ticket tab (504) in the browser (502) after the selection of an account from the account table section (514). The ticket tab (504) includes an account details section (522) and a question answer section (524).

In one or more embodiments, the account details section (522) enumerates a set of dummy credentials that have been mapped by the support server to a set of corresponding user credentials. The set of the dummy credentials includes the following:

| Credential Type | Dummy Credential |
| --- | --- |
| Password | DUMMY5145 |
| AccessId | DUMMY5565 |

In one or more embodiments, the question answer section (524) enumerates a set of question answer pairs. The questions are displayed so that the developer will know what the question is. The answers have been mapped by the support server from a set of corresponding user credentials (answers). The set of answers are stored as additional dummy credentials in the set of dummy credentials associated with the selected account. In one or more embodiments, the question answer pairs include at least the following questions that are associated with a dummy credential answer:

| Question | Dummy Credential Answer |
| --- | --- |
| What television show did you watch Frequently as a child? | MFA_4990 |
| What is the name of your first pet? | MFA_4614 |
| As a child, what did you want to be when you grew up? | MFA_5324 |

Figure 5D:
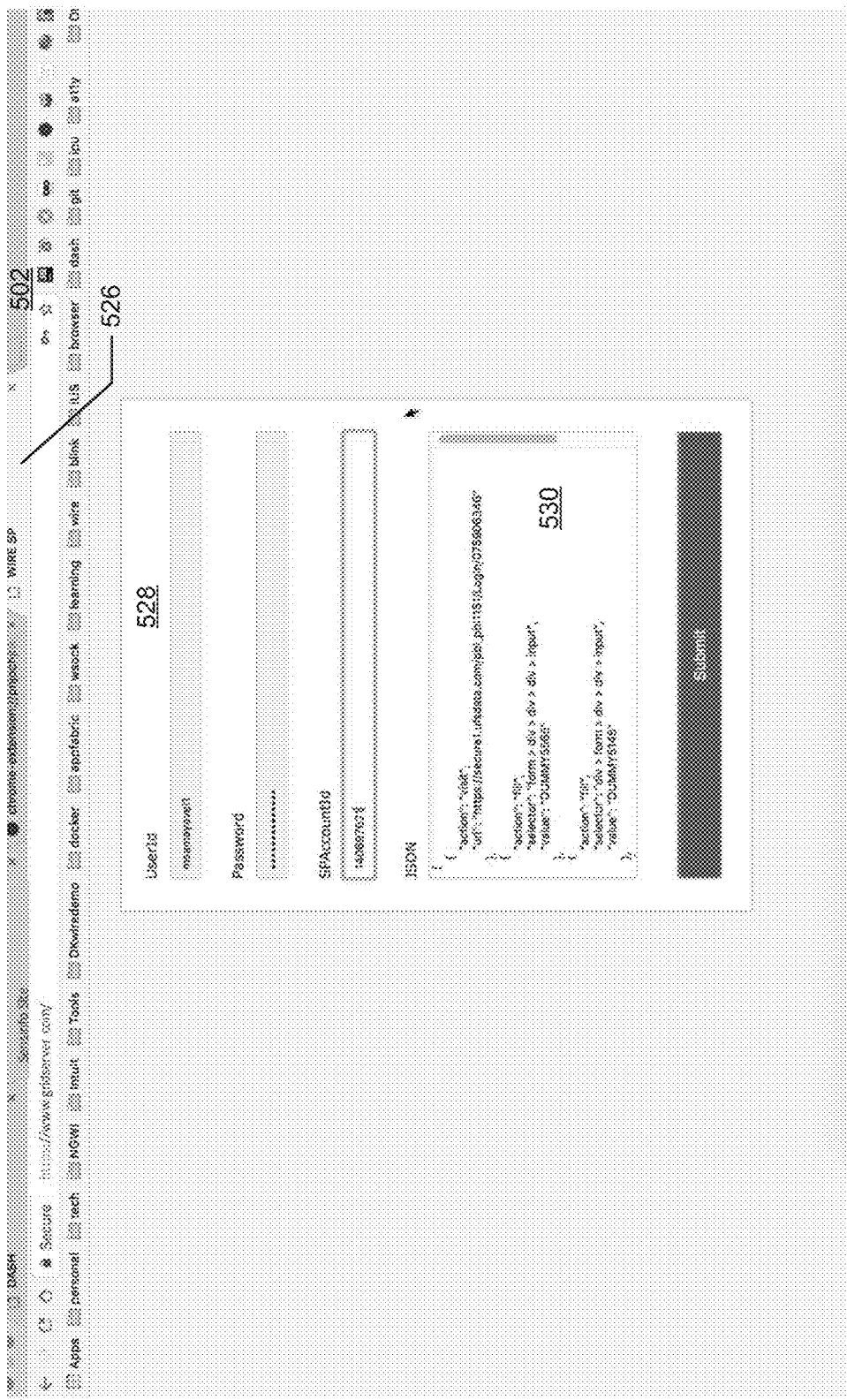

Referring to FIG. 5D, the user interface (500) is updated to display the grid server tab (526) in the browser (502). After opening the grid server tab (526) as a new tab, the grid server URL, which identifies a web page posted by the grid server, is entered into the address of the new tab and opened by the browser (502).

In one or more embodiments, the first time the Grid server URL is loaded, the grid server returns a logon page that includes a logon information section (528). The logon information section (528) includes a set of elements that are used to provide the logon information to the grid server. In one or more embodiments, the set of elements are each labeled and include a user identifier text field, a password text field, an account identifier text field, a command section (530), and a submission button.

In one or more embodiments, the user identifier text field is an input field that receives a text string. The text string input to the user identifier text field corresponds to a developer credential that is associated with the selected ticket.

In one or more embodiments, the password text field is another input field that receives a text string. The text string input to the password text field corresponds to a developer credential that has been associated with the selected ticket.

In one or more embodiments, the account identifier text field is another input field that receives a text string. The text string input to the account identifier text field corresponds to the information server that is associated with the selected ticket.

In one or more embodiments, the command section (530) is an input text field that can receive a multi-line text string. The text string provided to the command section (530) includes one or more JSON formatted script commands. The script commands will be converted by the grid server to browser commands that are executed by the browser running in the executor instance on the grid server. In one or more embodiments, the commands in the command section (530) will be automatically executed by the browser after the browser is running.

In one or more embodiments, the submission button is a user interface element that initiates an action. Upon selection of the submission button, the text from the input fields are transmitted to the grid server to be processed.

In the example shown the command section (530) includes the following commands:

```
[
  {
    "action": "visit",
    "url": "https://securel.ufsdata.com/pbi_pbil151/Login/075906346"
  },
  {
    "action": "fill",
    "selector": "form>div>div>div>input"
    "value": "DUMMY5565"
  },
  {
    "action": "fill",
    "selector": "div>form>div>div>input"
    "value": "DUMMY5145"
  },
  {
    "action": "click",
    "selector": "div>form>div>div>button"
  },
]
```

In one or more embodiments, the commands in the command section (530) are updated from the commands that were captured from the click stream. Specifically, the placeholder values "_placeholder_1_" and "_placeholder_2_" have been replaced by dummy credentials "DUMMY5565" and "DUMMY5145".

Figure 5E:
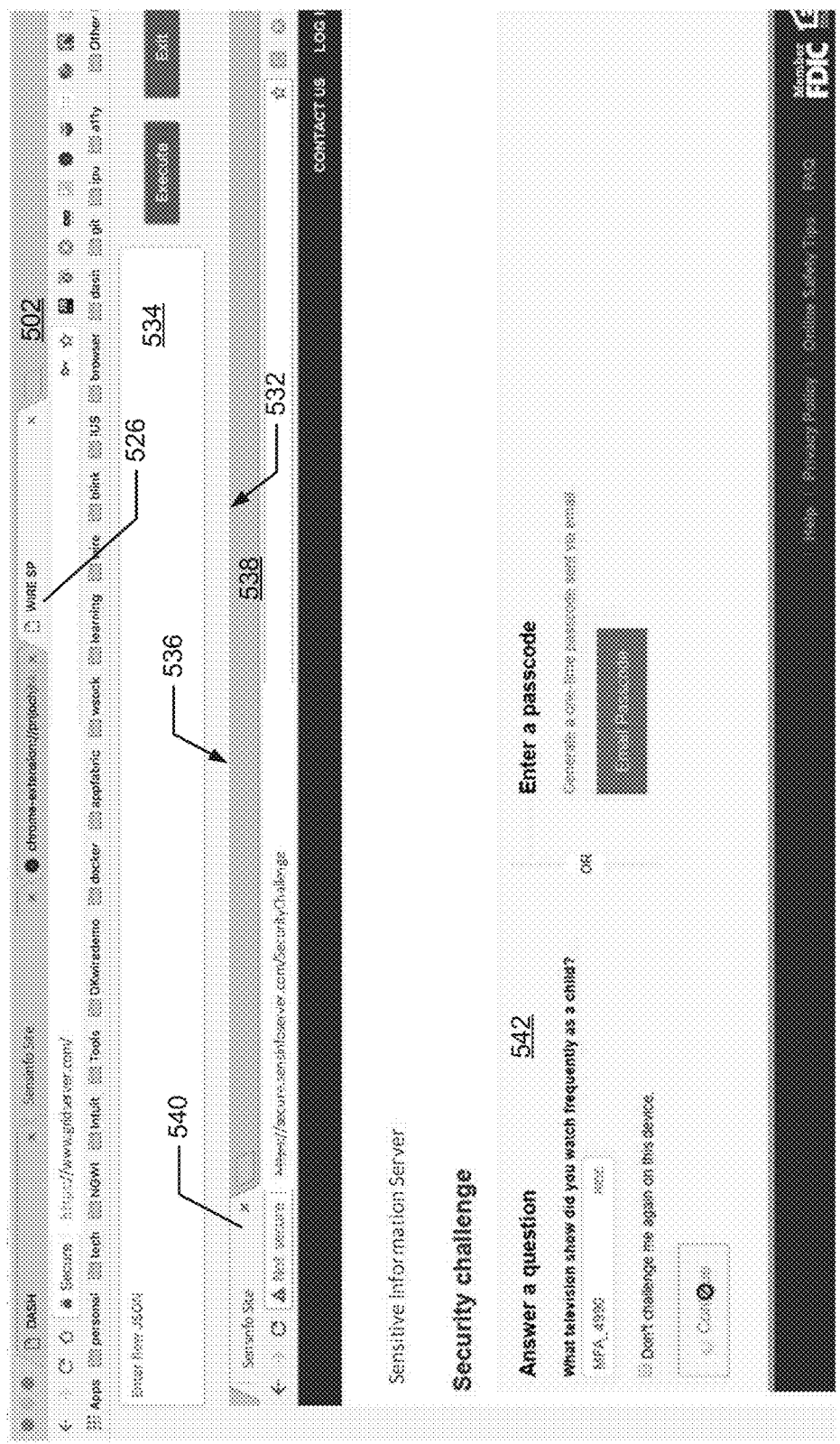

Referring to FIG. 5E, the user interface (500) is updated to display new information from the grid server in the grid server tab (526). The page from the grid server is updated to include a command section (532) and a remote browser section (536).

In one or more embodiments, the command section (532) includes a multi-line input field for additional JSON formatted script commands. Upon selection of the execute button within the command section (532), the additional JSON formatted script commands are sent to the grid server to be executed by the browser.

In one or more embodiments, upon selection of the exit button, one or more of the browser and the executor instance are terminated. The grid server then resends the logon page (FIG. 5D) so that a new session can be started.

In one or more embodiments, the remote browser section (536) displays a remote view (538) of the browser running on the executor instance on the grid server. The first remote tab 540 in the remote browser section (536) executed the JSON commands for visiting the information server, filling in the username and password, and clicking on the login button at the logon page provided by the information server. The first remote tab (540) was then updated to show the security challenge page that includes a question answer section (542). A dummy credential answer "MFA_4990" is provided to the question and the continue button was selected.

Figure 5F:
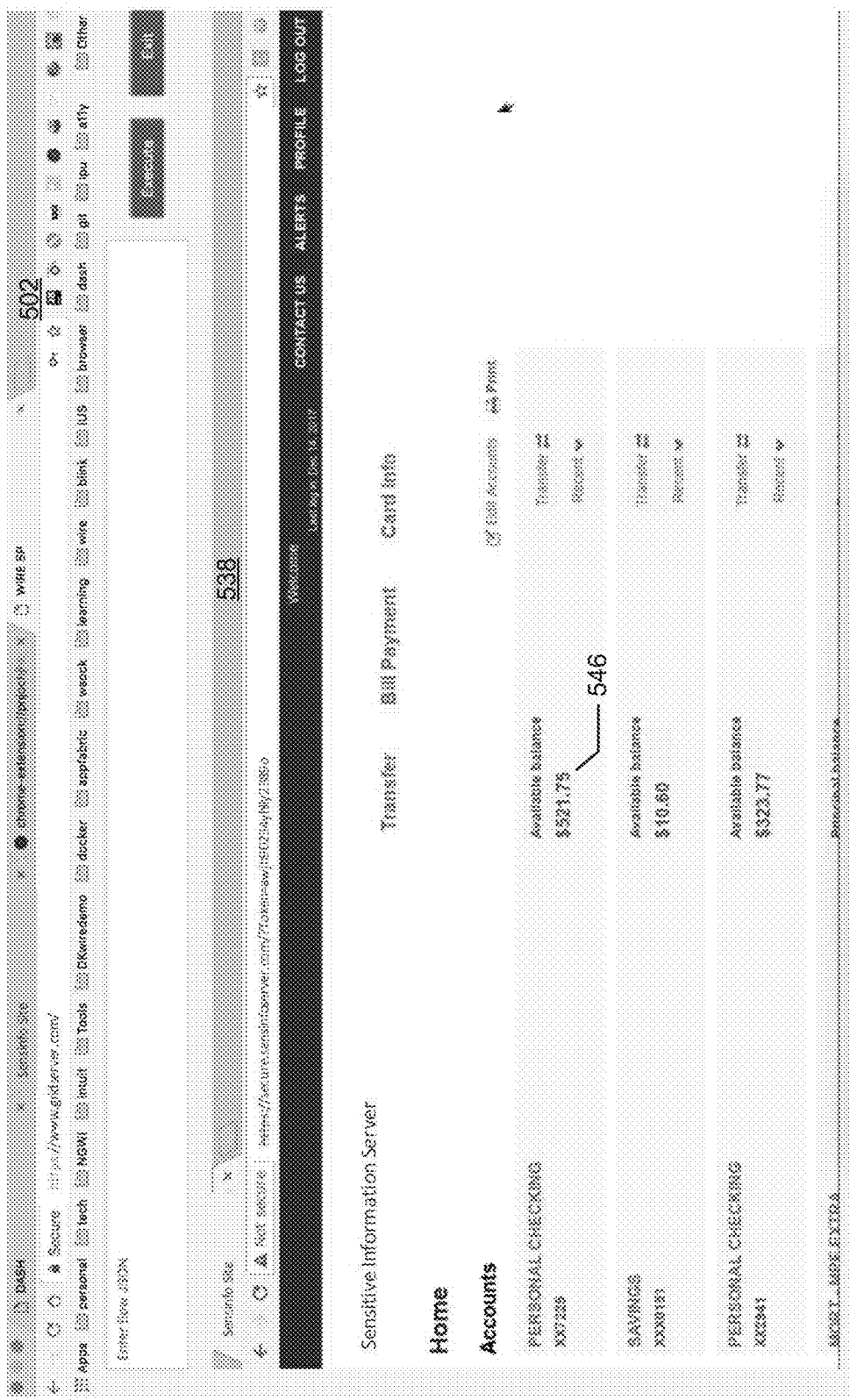

Referring to FIG. 5F, the user interface (500) is updated to show an account balance page provided by the information server in the remote view (538) of the browser on the executor instance of the grid server. The account balance page includes masked information (546) that was masked by the support server. The account balance (546) of the user is masked. The account balance (546) has been randomized, as discussed above, to prevent transmission of the real name and the real account balance to the developer machine. In one or more additional or alternative embodiments, the name of the user, when included in the information provided by the information server, may also be masked, obfuscated, or randomized.

Figure 5G:
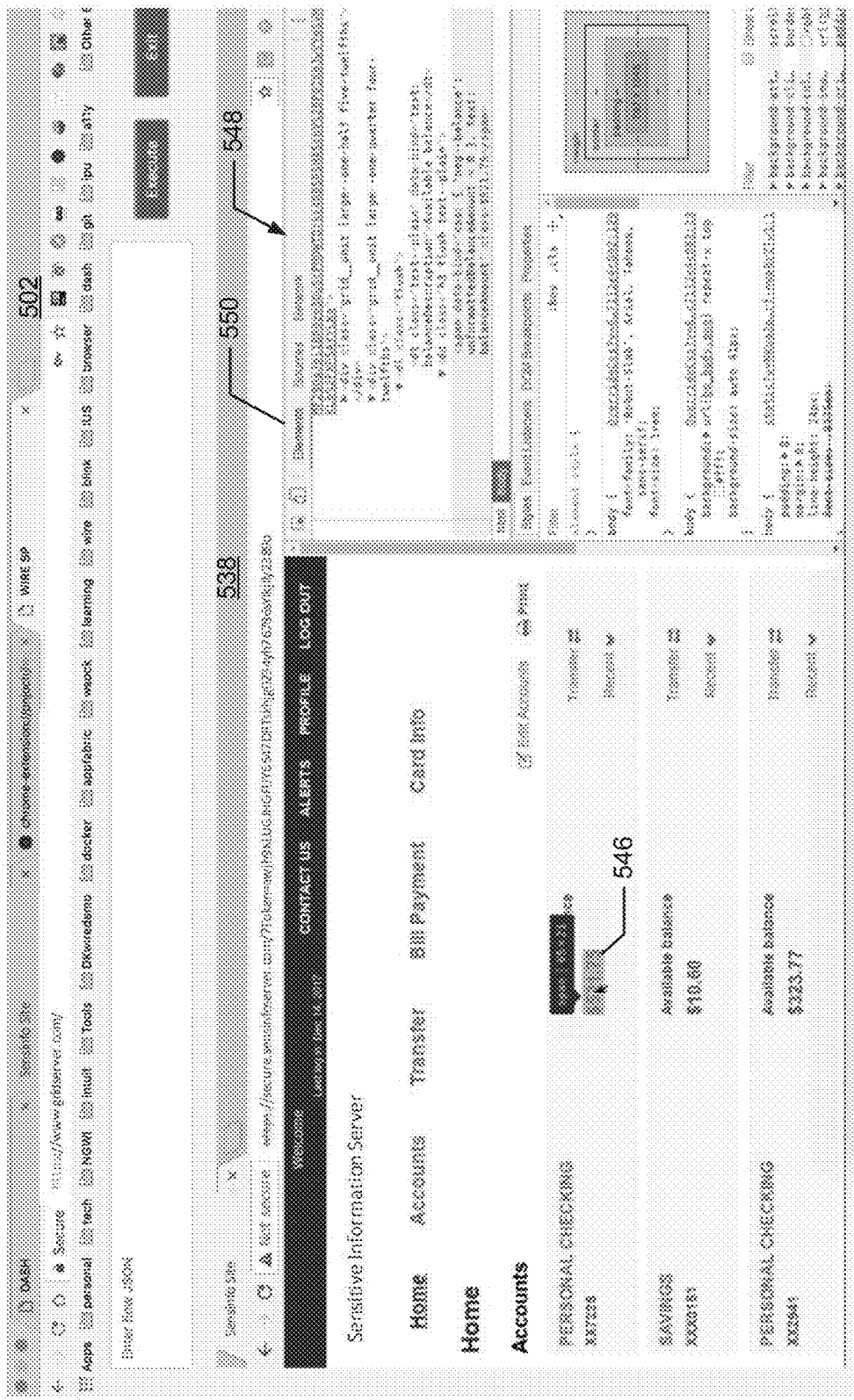

Referring to FIG. 5G, the user interface (500) is updated to show the developer tools section (548) in the remote view (538) of the browser on the executor instance of the grid server. In one or more embodiments, the elements tab (550) of the developer tools section (548) has been selected and shows a hierarchical source code view of the page rendered by the browser. The account balance (546) is selected in the page and the source code for the account balance (546) is shown in the element tab (550).

Figure 5H:
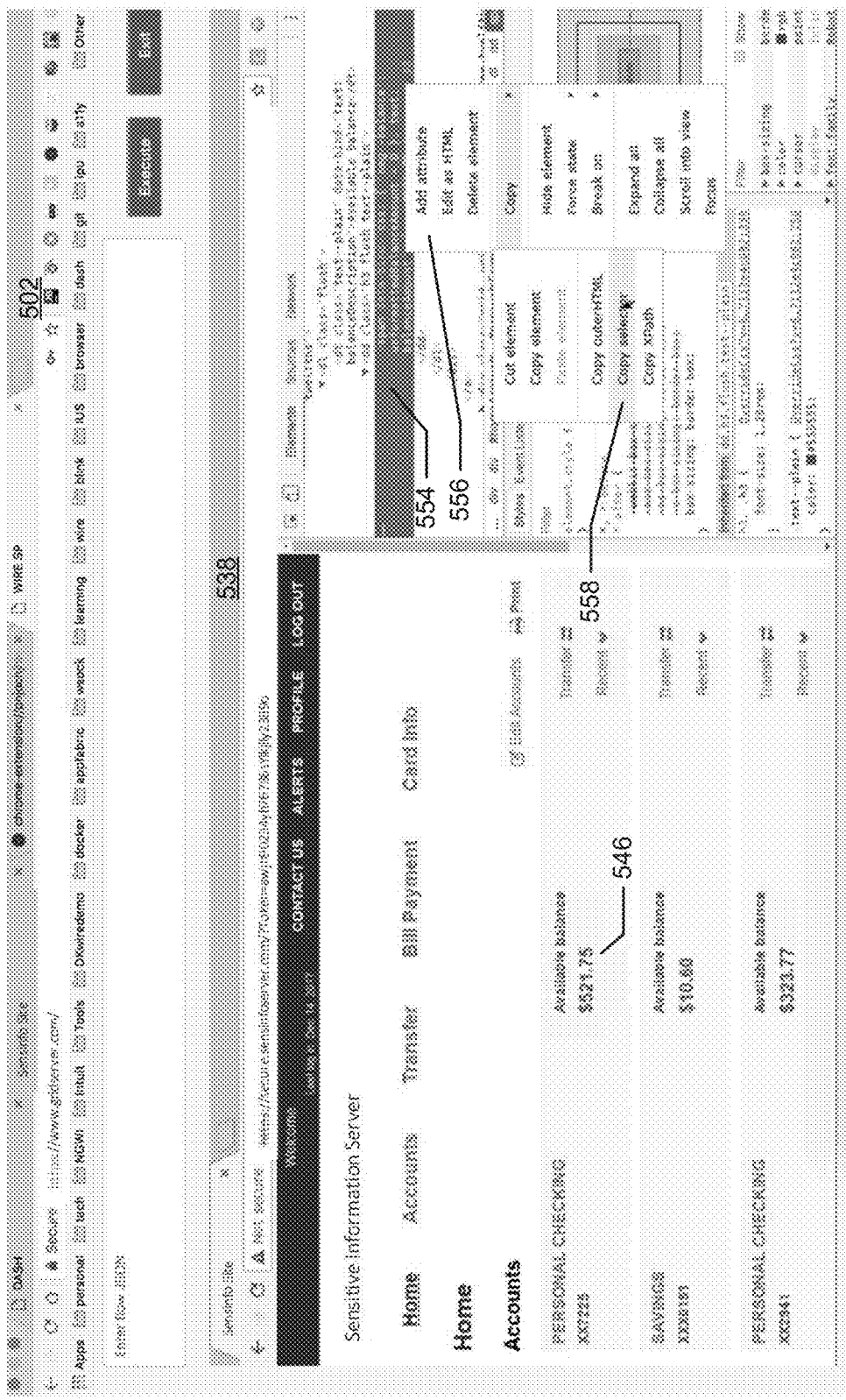
Figure 51:
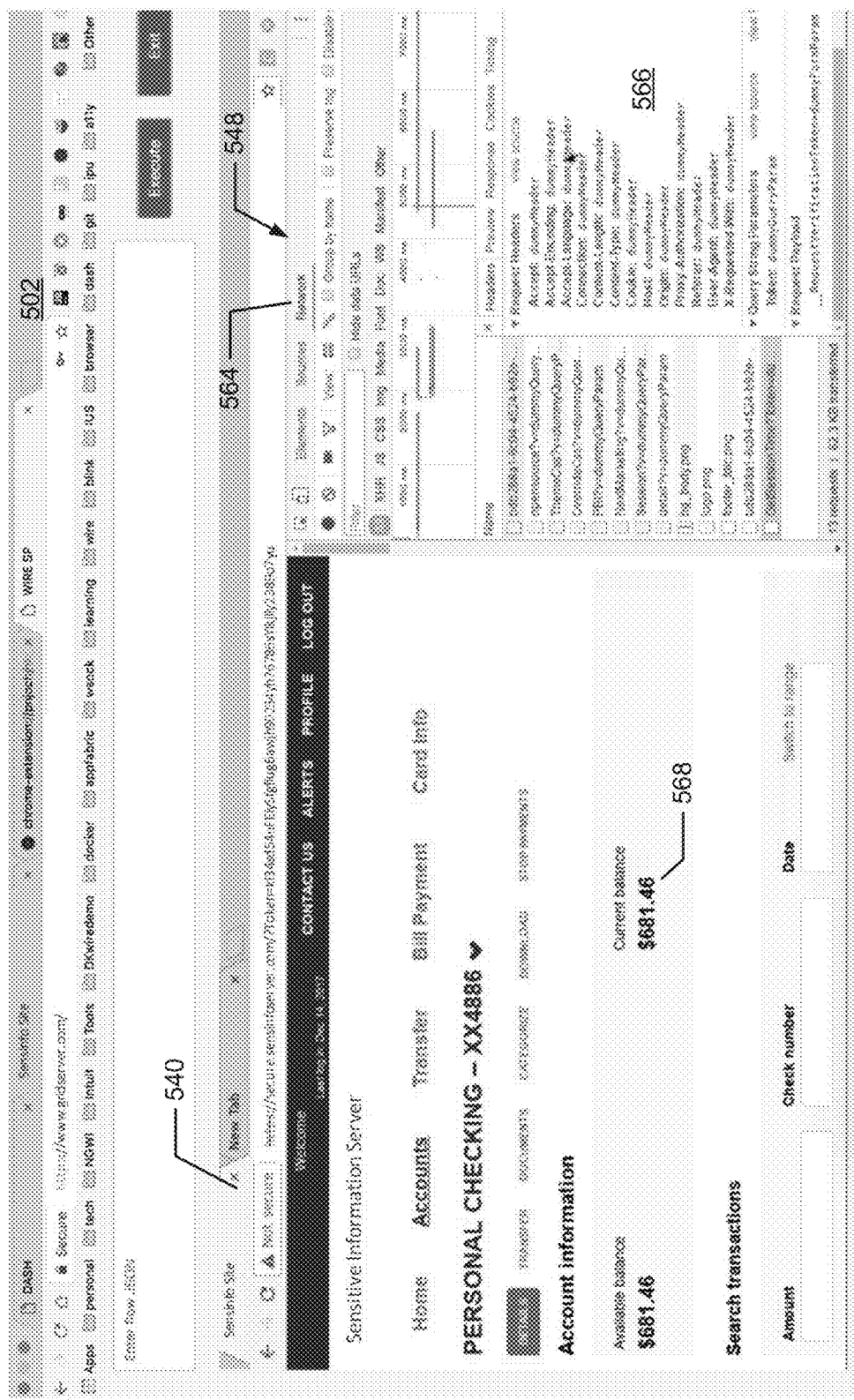

Referring to FIG. 5H, the user interface (500) is updated to show the copying of a selector for the account balance (546). After the account balance (546) was selected (FIG. 5G), the source code (554) for the account balance (546) is right clicked to bring up the menu (556). After bringing up the menu (556), the copy selector item (558) is selected. The copy selector item (558) copies the text value of a CSS selector that identifies the element in the document object model (DOM) of the page that corresponds to the account balance (546). The selector is copied to the clipboard of the executor instance. In the example of FIG. 5H, the selector that identifies the account balance (546) is:
account_0>div:nth-child(2)>a>div.grid_unit.large-one-quarter.four-twelfths>d1>dd>span This selector is inserted into a command in a script to scrape the account balance (546) from the information server, which can be used to scrape other accounts of other users for the same information server. In additional or alternative environments, the selector is copied to the clipboard of the developer machine.

Referring to FIG. 5I, the user interface (500) is updated to show the network tab (564) in the developer tools section (548). In one or more embodiments, the network tab (564) includes the headers section (566). The headers section (566) includes data that has been either masked by the support server or substituted by the grid server. A problem with allowing access to the developer tools in the browser in prior systems is that a developer could use the developer tools to access user credentials, personally identifying information, or other information (such as network headers and traffic information) that could be used to determine the user credentials or the personally identifying information. A technological solution to this technological problem is provided by substituting and masking the information that is rendered by the browser so that the developer cannot access the mask or substituted information.

Figure 6:
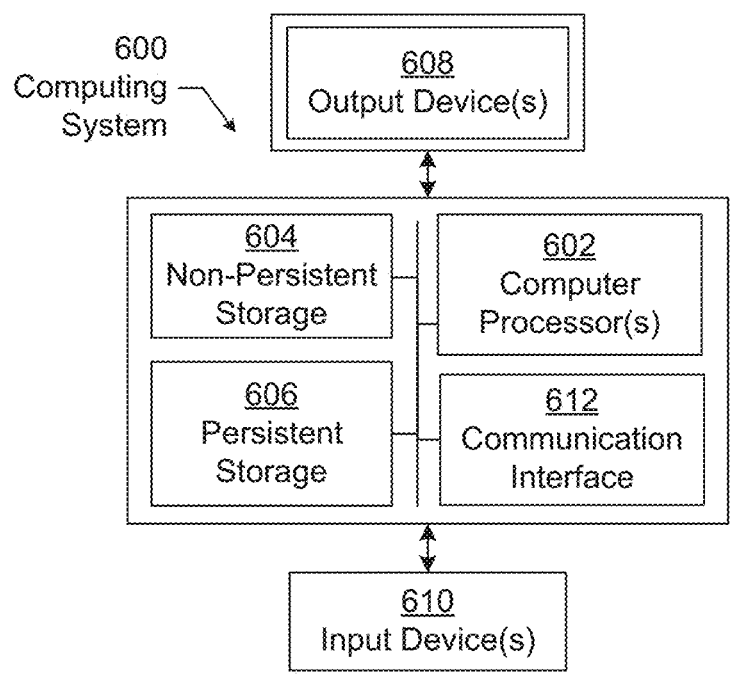
FIG. 6 shows a computing system in accordance with one or more embodiments of the present disclosure.

Referring to FIG. 6, embodiments of the present disclosure may be implemented on a computing system. Any combination of mobile, desktop, server, embedded device, or other types of hardware may be used. For example, as shown in FIG. 6, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the present disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the present disclosure.

Thus, the embodiments and examples set forth herein were presented in order to best explain various embodiments and their particular application(s) and to thereby enable those skilled in the art to make and use the embodiments. However, those skilled in the art will recognize that the foregoing description and examples have been presented for the purposes of illustration and example only. The description as set forth is not intended to be exhaustive or to be limiting to the precise form disclosed.

While many embodiments have been described, those skilled in the art, having benefit of this disclosure, will appreciate that other embodiments can be devised which do not depart from the scope. Accordingly, the scope of the present disclosure should be limited only by the attached claims.

What is claimed is:

1. A method for substituting credentials, comprising:
generating a response to a request associated with access to an information server, the response including a first page with one or more entry fields that each accept a developer credential of a set of developer credentials and with an entry field that accepts a first set of script commands;
receiving a first developer credential of the set of developer credentials and the first set of script commands; wherein the first set of script commands include a first dummy credential of the set of dummy credentials;
instantiating an executor instance that executes a browser;
accessing, by the browser, a second page from the information server using a first credential of the set of user credentials;
rendering, by the browser, the second page with a first dummy credential of the set of dummy credentials that is mapped to the first user credential of the set of user credentials; and
transmitting a third page to the developer machine, the third page including a section that displays the second page rendered by the browser with the first dummy credential.

2. The method of claim 1, further comprising:
before generating the response, obtaining a set of dummy credentials, the dummy credentials are mapped to a set of developer credentials, are authorized for a predetermined period of time, and are mapped to a set of user credentials that are inaccessible to a developer machine.

3. The method of claim 1, further comprising:
before generating the response, receiving the request that is associated with access to the information server.

4. The method of claim 1, wherein the browser is a second browser and the method further comprises:
after generating the response, transmitting the response to the developer machine, which displays the first page with a first browser.

5. The method of claim 1, further comprising:
after instantiating the executor instance, executing the first set of script commands to control the second browser to access the information server.

6. The method of claim 1, wherein the section is a first section and the method further comprises:
transmitting the third page with a second section that accepts a second set of script commands.

7. The method of claim 1, further comprising:
rendering the second page with obfuscated information that replaced personally identifying information in the second page that was provided by the information server.

8. A system for substituting credentials, comprising:
a computer processor;
a memory;
a set of instructions in the memory that when executed by the computer processor cause the computer processor to perform the steps of:
generating a response to a request associated with access to an information server, the response including a first page with one or more entry fields that each accept a developer credential of a set of developer credentials and with an entry field that accepts a first set of script commands;
receiving a first developer credential of the set of developer credentials and the first set of script commands; wherein the first set of script commands include a first dummy credential of the set of dummy credentials;
instantiating an executor instance that executes a browser;
accessing, by the browser, a second page from the information server using a first credential of the set of user credentials;
rendering, by the browser, the second page with a first dummy credential of the set of dummy credentials that is mapped to the first user credential of the set of user credentials; and
transmitting a third page to the developer machine, the third page including a section that displays the second page rendered by the browser with the first dummy credential.

9. The system of claim 8, wherein the set of instructions further cause the processor to perform the step of:
before generating the response, obtaining a set of dummy credentials, the dummy credentials are mapped to a set of developer credentials, are authorized for a predetermined period of time, and are mapped to a set of user credentials that are inaccessible to a developer machine.

10. The system of claim 8, wherein the set of instructions further cause the processor to perform the step of:
before generating the response, receiving the request that is associated with access to the information server.

11. The system of claim 8, wherein the browser is a second browser and the set of instructions further cause the processor to perform the step of:
after generating the response, transmitting the response to the developer machine, which displays the first page with a first browser.

12. The system of claim 8, wherein the set of instructions further cause the processor to perform the step of:
after instantiating the executor instance, executing the first set of script commands to control the second browser to access the information server.

13. The system of claim 8, wherein the section is a first section and the set of instructions further cause the processor to perform the step of:
transmitting the third page with a second section that accepts a second set of script commands.

14. The system of claim 8, wherein the set of instructions further cause the processor to perform the step of:
rendering the second page with obfuscated information that replaced personally identifying information in the second page that was provided by the information server.

15. A non-transitory computer readable medium for substituting credentials, the non-transitory computer readable medium comprising computer readable program code for:
generating a response to a request associated with access to an information server, the response including a first page with one or more entry fields that each accept a developer credential of a set of developer credentials and with an entry field that accepts a first set of script commands;
receiving a first developer credential of the set of developer credentials and the first set of script commands; wherein the first set of script commands include a first dummy credential of the set of dummy credentials;
instantiating an executor instance that executes a browser;
accessing, by the browser, a second page from the information server using a first credential of the set of user credentials;
rendering, by the browser, the second page with a first dummy credential of the set of dummy credentials that is mapped to the first user credential of the set of user credentials; and
transmitting a third page to the developer machine, the third page including a section that displays the second page rendered by the browser with the first dummy credential.

16. The non-transitory computer readable medium of claim 15, further comprising computer readable program code for:
before generating the response, obtaining a set of dummy credentials, the dummy credentials are mapped to a set of developer credentials, are authorized for a predetermined period of time, and are mapped to a set of user credentials that are inaccessible to a developer machine.

17. The non-transitory computer readable medium of claim 15, further comprising computer readable program code for:
before generating the response, receiving the request that is associated with access to the information server.

18. The non-transitory computer readable medium of claim 15, wherein the browser is a second browser and further comprising computer readable program code for:
after generating the response, transmitting the response to the developer machine, which displays the first page with a first browser.

19. The non-transitory computer readable medium of claim 15, further comprising computer readable program code for:
after instantiating the executor instance, executing the first set of script commands to control the second browser to access the information server.

20. The non-transitory computer readable medium of claim 15, wherein the section is a first section and further comprising computer readable program code for:
transmitting the third page with a second section that accepts a second set of script commands.

21. The non-transitory computer readable medium of claim 15, further comprising computer readable program code for:
rendering the second page with obfuscated information that replaced personally identifying information in the second page that was provided by the information server.

* * * * *